US010234307B1

(12) United States Patent
McGruder et al.

(10) Patent No.: US 10,234,307 B1
(45) Date of Patent: *Mar. 19, 2019

(54) SLOT-BASED FENESTRATION UNIT MONITORING APPARATUS AND METHODS

(71) Applicant: ANDERSEN CORPORATION, Bayport, MN (US)

(72) Inventors: Ross McGruder, St. Paul, MN (US); Chris Buege, Marine on St. Croix, MN (US)

(73) Assignee: ANDERSEN CORPORATION, Bayport, MN (US)

( * ) Notice: Subject to any disclaimer, the term of this patent is extended or adjusted under 35 U.S.C. 154(b) by 562 days.

This patent is subject to a terminal disclaimer.

(21) Appl. No.: 14/983,754

(22) Filed: Dec. 30, 2015

Related U.S. Application Data

(60) Provisional application No. 62/099,902, filed on Jan. 5, 2015.

(51) Int. Cl.

| | |
|---|---|
| ***E06B 7/00*** | (2006.01) |
| ***G01D 5/12*** | (2006.01) |
| ***H01H 36/00*** | (2006.01) |
| ***H01H 11/00*** | (2006.01) |

(52) U.S. Cl.
CPC ................. *G01D 5/12* (2013.01); *E06B 7/00* (2013.01); *H01H 11/005* (2013.01); *H01H 36/0013* (2013.01)

(58) Field of Classification Search
CPC ............ G08B 13/08; H01H 36/00; E06B 7/00
See application file for complete search history.

(56) References Cited

U.S. PATENT DOCUMENTS

| | | | |
|---|---|---|---|
| 3,525,830 | A | 8/1970 | Hawkins |
| 3,641,540 | A | 2/1972 | Cutler et al. |
| 4,196,422 | A | 4/1980 | Swigert et al. |
| 4,336,518 | A | 6/1982 | Holce et al. |
| 4,346,372 | A | 8/1982 | Sandberg |
| 4,360,803 | A | 11/1982 | Heiland |
| 4,381,504 | A | 4/1983 | Bitko |
| 4,456,897 | A | 6/1984 | Holce et al. |
| 4,465,997 | A | 8/1984 | Hines |
| 4,755,799 | A | 7/1988 | Romano |
| 4,760,380 | A | 7/1988 | Quenneville et al. |
| 4,845,471 | A | 7/1989 | Chu |
| 5,006,766 | A | 4/1991 | Yuhas et al. |
| 5,077,547 | A | 12/1991 | Burgmann |

(Continued)

*Primary Examiner* — Phung Nguyen
(74) *Attorney, Agent, or Firm* — Mueting, Raasch & Gebhardt, P.A.

(57) ABSTRACT

Fenestration unit monitoring apparatus configured to retrofit an existing fenestration unit to incorporate components that are capable of monitoring the locked or unlocked status of the existing lock assembly and/or the panel position status of a movable panel of the fenestration unit. The fenestration unit monitoring apparatus described herein may provide a relatively easy and aesthetically pleasing option to monitor the lock status and/or panel status of an existing fenestration unit with an existing lock assembly already located thereon. The fenestration unit monitoring apparatus may be inserted into an existing lock assembly slot in a frame member of an existing fenestration unit that already contains a lock assembly without requiring removal of the lock assembly from the lock assembly slot.

20 Claims, 16 Drawing Sheets

(56) References Cited

U.S. PATENT DOCUMENTS

| | | | |
|---|---|---|---|
| 5,155,460 | A | 10/1992 | Huckins et al. |
| 5,226,256 | A | 7/1993 | Fries et al. |
| 5,311,168 | A | 5/1994 | Pease, Jr. et al. |
| 5,355,059 | A | 10/1994 | McMillan |
| 5,373,716 | A | 12/1994 | MacNeil et al. |
| 5,449,987 | A | 9/1995 | McMillan |
| 5,479,151 | A | 12/1995 | Lavelle et al. |
| 5,486,812 | A | 1/1996 | Todd |
| 5,499,014 | A | 3/1996 | Greenwaldt |
| 5,595,075 | A | 1/1997 | Chen |
| 5,656,982 | A | 8/1997 | Kurahara |
| 5,686,890 | A | 11/1997 | Ko |
| 5,712,621 | A | 1/1998 | Andersen |
| 5,783,995 | A | 7/1998 | Jackson |
| 5,841,361 | A | 11/1998 | Hoffman |
| 5,999,095 | A | 12/1999 | Earl et al. |
| 6,057,769 | A | 5/2000 | Stevenson |
| 6,078,269 | A | 6/2000 | Markwell et al. |
| 6,161,881 | A | 12/2000 | Babka et al. |
| 6,212,923 | B1 | 4/2001 | Clark |
| 6,420,973 | B2 | 7/2002 | Acevedo |
| 6,441,735 | B1 | 8/2002 | Marko et al. |
| 6,615,629 | B2 | 9/2003 | Bates et al. |
| 6,661,340 | B1 | 12/2003 | Saylor et al. |
| 6,724,316 | B2 | 4/2004 | Addy et al. |
| 6,778,086 | B2 | 8/2004 | Morrone et al. |
| 6,853,145 | B2 | 2/2005 | Kang et al. |
| 6,871,885 | B2 | 3/2005 | Goldenberg et al. |
| 6,888,459 | B2 | 5/2005 | Stilp |
| 6,963,280 | B2 | 11/2005 | Eskildsen |
| 6,968,646 | B2 | 11/2005 | Goldenberg et al. |
| 6,987,450 | B2 | 1/2006 | Marino et al. |
| 7,019,639 | B2 | 3/2006 | Stilp |
| 7,023,341 | B2 | 4/2006 | Stilp |
| 7,042,353 | B2 | 5/2006 | Stilp |
| 7,053,764 | B2 | 5/2006 | Stilp |
| 7,057,512 | B2 | 6/2006 | Stilp |
| 7,068,162 | B2 | 6/2006 | Maple et al. |
| 7,079,020 | B2 | 7/2006 | Stilp |
| 7,079,034 | B2 | 7/2006 | Stilp |
| 7,084,756 | B2 | 8/2006 | Stilp |
| 7,091,827 | B2 | 8/2006 | Stilp |
| 7,119,658 | B2 | 10/2006 | Stilp |
| 7,119,678 | B2 | 10/2006 | Katz |
| 7,120,795 | B2 | 10/2006 | Raphael et al. |
| 7,142,111 | B2 | 11/2006 | Eskildsen et al. |
| D534,146 | S | 12/2006 | Stilp et al. |
| 7,147,255 | B2 | 12/2006 | Goldenberg et al. |
| D534,519 | S | 1/2007 | Stilp et al. |
| 7,158,029 | B1 | 1/2007 | Martyn |
| 7,202,789 | B1 | 4/2007 | Stilp |
| 7,227,463 | B2 | 6/2007 | Merrell |
| 7,230,532 | B2 | 6/2007 | Albsmeier et al. |
| 7,355,515 | B2 | 4/2008 | Lee et al. |
| 7,753,418 | B2 | 7/2010 | Fleming |
| 8,193,935 | B2 | 6/2012 | Gates |
| 8,456,305 | B2 | 6/2013 | Gates |
| 8,624,736 | B2 * | 1/2014 | Gore ...................... G08B 13/04 292/38 |
| 8,640,384 | B2 | 2/2014 | Curtis |
| 2006/0192396 | A1 | 8/2006 | Frolov et al. |
| 2007/0080541 | A1 * | 4/2007 | Fleming .................... E05B 7/00 292/35 |
| 2007/0194914 | A1 | 8/2007 | Gates |
| 2016/0221501 | A1 | 8/2016 | Linden et al. |
| 2018/0058105 | A1 * | 3/2018 | Van Klompenburg ...................... E05B 63/185 |

* cited by examiner

SLOT-BASED FENESTRATION UNIT MONITORING APPARATUS AND METHODS

RELATED APPLICATION

This application claims the benefit under 35 U.S.C. Section 119 of U.S. Provisional Patent Application Ser. No. 62/099,902 entitled "SLOT-BASED FENESTRATION UNIT MONITORING APPARATUS AND METHODS" and filed on Jan. 5, 2015, which is incorporated herein by reference in its entirety.

Slot-based fenestration unit monitoring apparatus and methods of installing the same are described herein.

Building security systems can vary in complexity from simple burglar alarms triggered by breakage of windows or other fenestration members, to comprehensive intrusion detection systems that collect data from video cameras, laser beams, infrared sensors, microphones, etc., analyze the data, and communicate information to a variety of destinations, such as security stations and automated building control centers.

Some examples of status monitoring apparatus that may be used to monitor the status of fenestration locks and the open or closed state of fenestration units are described in U.S. Pat. No. 8,624,736 to Gore et al. Although those devices, systems, and methods are useful, they do not specifically address retrofitting an existing fenestration unit having a lock assembly located in a lock assembly slot such as in, e.g., a casement window.

SUMMARY

The fenestration unit monitoring apparatus described herein are configured to retrofit an existing fenestration unit to incorporate components that are capable of monitoring the locked or unlocked status of the existing lock assembly and/or the panel position status of a movable panel of the fenestration unit.

The fenestration unit monitoring apparatus described herein may provide, in one or more embodiments, a relatively easy and aesthetically pleasing option to monitor the lock status and/or panel status of an existing fenestration unit with an existing lock assembly already located thereon. In one or more embodiments, the fenestration unit monitoring apparatus includes components configured for insertion into an existing lock assembly slot in a frame member of an existing fenestration unit that already contains a lock assembly without requiring removal of the lock assembly from the lock assembly slot.

In one or more embodiments, the fenestration unit monitoring apparatus described herein are configured for retrofitting an existing fenestration unit having a lock assembly located in a lock assembly slot in a frame member of a fenestration unit panel. One or more embodiments of the fenestration unit monitoring apparatus may include: a device body configured for insertion into the lock assembly slot in the frame member of the fenestration unit panel when the lock assembly slot is occupied by the lock assembly, wherein the device body comprises a leading edge, a trailing edge, a first end located between the leading edge and the trailing edge, and a second end located between the leading edge and the trailing edge; a bezel attached to the device body and positioned along the trailing edge of the device body such that device body and bezel are configured for insertion of the leading edge of the device body into the lock assembly slot ahead of the trailing edge; a lock cavity defined in the leading edge of the device body between the first and second ends, wherein the lock cavity is positioned and sized to receive a portion of the lock assembly located in the lock assembly slot of the frame member when the device body is located in the lock assembly slot of the frame member with the bezel located proximate a surface of the frame member; and a monitor body attached to the device body. In one or more embodiments, the monitor body comprises: a lock status sensor operably attached to the monitor body, wherein the lock status sensor is configured to detect when the lock assembly is in a locked state; a panel position sensor attached to the monitor body, the panel position sensor configured to detect a position of the fenestration unit panel; and a controller attached to the monitor body. In one or more embodiments, the controller is operably connected to the lock status sensor and the panel position sensor, and is configured to: receive a lock signal from the lock status sensor when the lock assembly is in the locked state; receive a panel position signal from the panel position sensor when the panel position sensor detects presence of the second panel; and provide an indication of a status of one or both of the lock signal and the panel position signal.

In one or more embodiments of the fenestration unit monitoring apparatus described herein, the bezel comprises a lock arm aperture aligned with the trailing edge of the device body and offset to one side of the device body such that a lock arm of the lock assembly passes over one side of the device body when moving into and out of the locked position. In one or more embodiments, the apparatus further comprises an indicator light mounted on the monitor body in a location such that the indicator light is visible through the lock arm aperture when the device body is located in the lock assembly slot.

In one or more embodiments of the fenestration unit monitoring apparatus described herein, the lock status sensor is located closer to the lock cavity than either of the first end or the second end of the of the device body.

In one or more embodiments of the fenestration unit monitoring apparatus described herein, the monitor body and the device body are configured to allow removal of the monitor body from the device body and re-attachment of the monitor body to the device body such that the monitor body is located between the lock cavity and the second end of the device body.

In one or more embodiments of the fenestration unit monitoring apparatus described herein, the apparatus further comprises a transmitter located on the monitor body and operably connected to the controller, wherein providing an indication of the status of one or both of the lock signal and the panel position signal comprises actuating the transmitter to transmit one or more control signals, wherein the one or more control signals are indicative of the status of one or both of the lock signal and the panel position signal. In one or more embodiments, the transmitter is operably connected to an antenna, wherein the antenna passes between the lock cavity and the trailing edge of the device body over a first surface of the device body, and wherein the antenna terminates at a location between the lock cavity and second end of the device body. In one or more embodiments, the bezel comprises a lock arm aperture aligned with the trailing edge of the device body and offset to one side of the device body such that a lock arm of the lock assembly passes over a second side of the device body when moving into and out of the locked position.

In one or more embodiments of the fenestration unit monitoring apparatus described herein, the lock status sensor comprises a proximity sensor configured to detect the presence of a lock component of the lock assembly when the lock assembly is in the locked state.

In one or more embodiments of the fenestration unit monitoring apparatus described herein, the lock status sensor comprises a magnetic switch mounted on the monitor body.

In one or more embodiments of the fenestration unit monitoring apparatus described herein, the panel position sensor is attached to the monitor body at a location closer to the leading edge of the device body than the trailing edge of the device body. In one or more embodiments, the panel position sensor comprises a magnetic switch. In one or more embodiments, the apparatus further comprises a plunger assembly separate and discrete from the device body, wherein the plunger assembly is configured for insertion into a bore located in the frame member proximate the leading edge of the device body. In one or more embodiments, the plunger assembly comprises: a plunger mounted for movement along a plunger axis within a housing; a permanent magnet attached to the plunger such that the permanent magnet moves along the plunger axis with the plunger; and a biasing element located in the housing, the biasing element exerting a biasing force moving the plunger to a first position in which the plunger extends out of the housing, wherein the plunger is configured to move into a second position in the housing along the plunger axis when the plunger is acted on by a force acting on the plunger against the biasing force. In one or more embodiments, the permanent magnet activates the magnetic switch when the plunger is in the second position but does not activate the magnetic switch when the plunger is in the first position.

In a second aspect, one or more embodiments of a method of installing a fenestration unit monitoring apparatus on an existing fenestration unit having a lock assembly located in a lock assembly slot in a frame member of a fenestration unit panel are described. In one or more embodiments the method may include: inserting a device body into the lock assembly slot in the frame member of the fenestration unit panel when the lock assembly slot is occupied by the lock assembly, wherein the device body comprises a leading edge, a trailing edge, a first end extending from the leading edge to the trailing edge and a second end extending from the leading edge to the trailing edge and a second end, and further wherein inserting the device body into the lock assembly slot comprises inserting the leading edge of the device body into the lock assembly slot while the trailing edge of the device body is attached to a bezel; wherein inserting the device body into the lock assembly slot positions the bezel on an outer surface of the frame member; wherein the device body comprises a lock cavity defined in the leading edge of the device body between the first and second ends, wherein inserting the device body into the lock assembly slot positions the lock cavity in the lock assembly slot such that the lock cavity receives a portion of the lock assembly located in the lock assembly slot; and wherein inserting the device body in the lock assembly slot positions a monitor body within the lock assembly slot, wherein the monitor body is attached to the device body. In one or more embodiments, the monitor body comprises: a lock status sensor operably attached to the monitor body, wherein the lock status sensor is configured to detect when the lock assembly is in a locked state; a panel position sensor attached to the monitor body, the panel position sensor configured to detect a position of the fenestration unit panel; and a controller attached to the monitor body, wherein the controller is operably connected to the lock status sensor and the panel position sensor. In one or more embodiments, the controller is configured to: receive a lock signal from the lock status sensor when the lock assembly is in the locked state; receive a panel position signal from the panel position sensor when the panel position sensor detects presence of the second panel; and provide an indication of a status of one or both of the lock signal and the panel position signal.

In one or more embodiments of the methods of installing a fenestration unit monitoring apparatus as described herein, the bezel comprises a lock arm aperture aligned with the trailing edge of the device body and offset to one side of the device body such that a lock arm of the lock assembly passes over one side of the device body when moving into and out of the locked position. In one or more embodiments, the apparatus further comprises an indicator light mounted on the monitor body in a location such that the indicator light is visible through the lock arm aperture when the device body is located in the lock assembly slot.

In one or more embodiments of the methods of installing a fenestration unit monitoring apparatus as described herein, the apparatus further comprises a transmitter located on the monitor body and operably connected to the controller, wherein providing an indication of the status of one or both of the lock signal and the panel position signal comprises actuating the transmitter to transmit one or more control signals, wherein the one or more control signals are indicative of the status of one or both of the lock signal and the panel position signal. In one or more embodiments, the transmitter is operably connected to an antenna, wherein the antenna passes between the lock cavity and the trailing edge of the device body over a first surface of the device body, and wherein the antenna terminates at a location between the lock cavity and second end of the device body. In one or more embodiments, the bezel comprises a lock arm aperture aligned with the trailing edge of the device body and offset to one side of the device body such that a lock arm of the lock assembly passes over a second side of the device body when moving into and out of the locked position.

In one or more embodiments of methods of installing a fenestration unit monitoring apparatus as described herein, the lock status sensor is located closer to the lock cavity than either of the first end or the second end of the of the device body.

In one or more embodiments of the methods of installing a fenestration unit monitoring apparatus as described herein, the lock status sensor comprises a magnetic switch mounted on the monitor body.

In one or more embodiments of the methods of installing a fenestration unit monitoring apparatus as described herein, the panel position sensor is attached to the monitor body at a location closer to the leading edge of the device body than the trailing edge of the device body.

In one or more embodiments of the methods of installing a fenestration unit monitoring apparatus as described herein, the panel position sensor comprises a magnetic switch and the method further comprises: forming a plunger bore in the frame member proximate the lock assembly slot, wherein the plunger bore is isolated from the lock assembly slot and positioned proximate the leading edge of the device body; and inserting a plunger assembly into the plunger bore. In one or more embodiments, the plunger assembly comprises: a plunger mounted for movement along a plunger axis within a housing; a permanent magnet attached to the plunger such that the permanent magnet moves along the plunger axis with the plunger; and a biasing element located in the housing, the biasing element exerting a biasing force moving the plunger to a first position in which the plunger extends out of the housing, wherein the plunger is configured to move into a second position in the housing along the plunger axis when the plunger is acted on by a force acting on the plunger against the biasing force. In one or more embodiments, the permanent magnet activates the magnetic switch when the plunger is in the second position but does not activate the magnetic switch when the plunger is in the first position. In one or more embodiments, forming the plunger bore comprises attaching a drill guide to the lock assembly by moving the lock assembly into the locked state, wherein a keeper on the drill guide is retained by a cam of the lock assembly.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other when the fenestration units described herein are properly installed in a building opening.

Where used herein, the terms "exterior" and "interior" are used in a relative sense, e.g., an exterior edge and an interior edge of a sill or any other component describe edges located on opposite sides of the fenestration unit. In other words, an exterior edge could be found within the interior of a building or other structure that would conventionally define an interior and an exterior, while an interior edge could be found outside of a building or other structure that would conventionally define an interior and an exterior.

The above summary is not intended to describe each embodiment or every implementation of the fenestration unit monitoring apparatus and methods described herein. Rather, a more complete understanding of the invention will become apparent and appreciated by reference to the following Description of Illustrative Embodiments and claims in view of the accompanying figures of the drawing. In

DESCRIPTION OF ILLUSTRATIVE EMBODIMENTS

Figure 1:
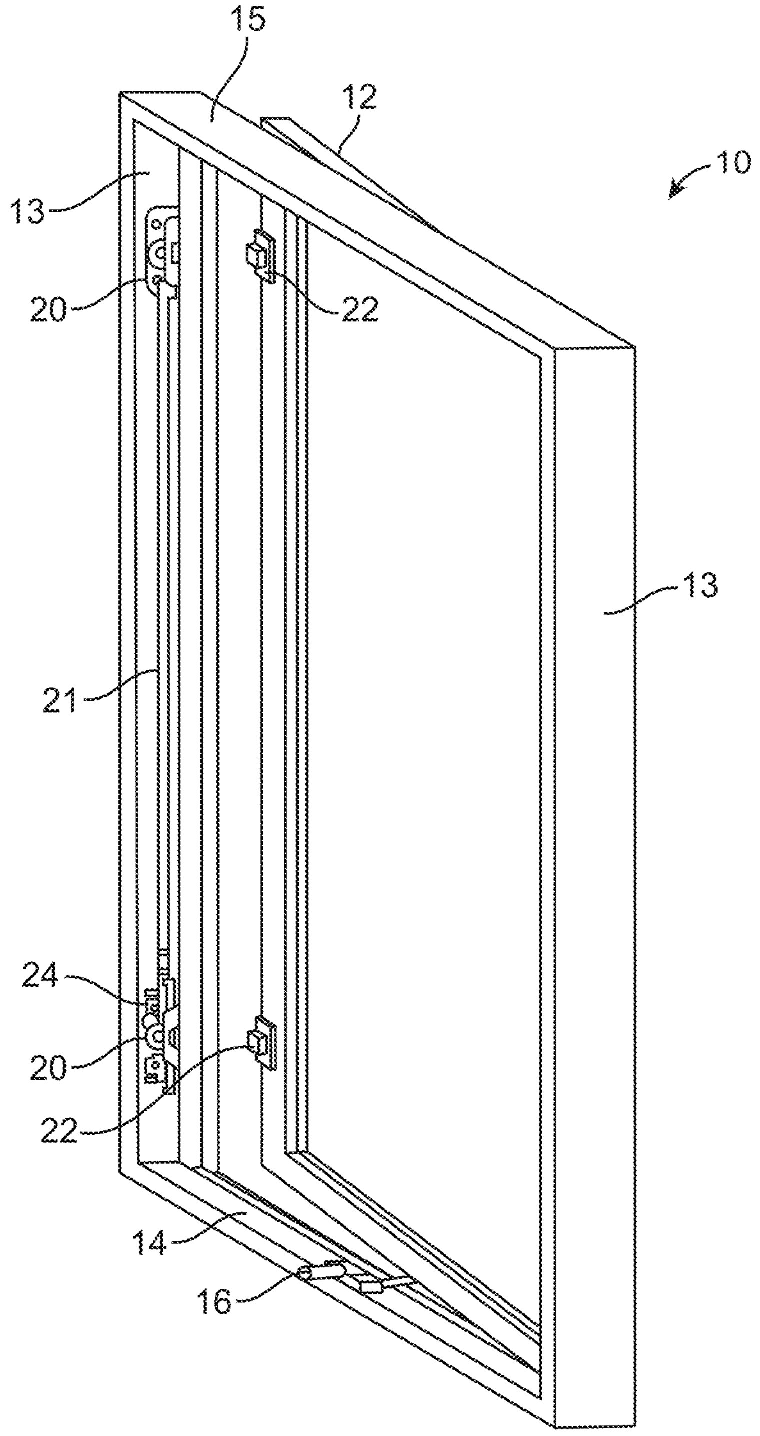
FIG. 1 is a perspective view of one illustrative embodiment of a fenestration unit in the form of a casement window.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

To facilitate an understanding and explanation of the invention, the elements and numerals as described herein may be referred to with the terms "upper," "lower," "top," "bottom," "front," and "back" to distinguish portions of the device. These conventions are merely included for ease of explanation and understanding and should not be construed as limiting in any manner. The descriptions of the parts detailed herein as "upper," "lower," etc. also can be referred to as "first," "second," etc.

FIG. 1 is a perspective view of a typical casement window 10 with which the fenestration unit monitoring apparatus described herein can be used. A portion of the trim has been removed in this view to expose the lock assemblies 20 used to secure the sash/panel 12 in a closed position. The sash/panel 12 of the window 10 is located within a frame that includes a pair of side jambs 13, a sill 14, and a top jamb 15. The sash/panel 12 is pivotally attached to the left side jamb 13 via one or more hinges (not shown). The sash 12 is further operatively connected to the frame sill 14 by a window operator 16 which may, in one or more embodiments, include a handle that can be used to move the sash/panel 12 into and out of the closed position.

The depicted fenestration unit 10 includes two keepers 22 that cooperate with two lock assemblies 20 to keep the sash/panel 12 in the closed position. While casement windows most commonly have two lock assemblies 20 and corresponding keepers 22, larger windows could use three or more lock assemblies and keepers, while smaller units may have only a single lock assembly and keeper. In fenestration units that include two lock assemblies as seen in FIG. 1, one of the lock assemblies may be connected to the other lock assembly by a mechanism such as, e.g., slide bar 21 (an example of which is described in, e.g., U.S. Pat. No. 6,161,881 to Babka et al.). As a result, only one of the lock assemblies 20 includes a handle 24 to open and close the lock assemblies 20.

Although the illustrative embodiment of fenestration unit 10 is in the form of a casement window, fenestration units with which the fenestration unit monitoring apparatus described herein may be used could include other styles of windows and doors that include a lock assembly slot into which the fenestration unit monitoring apparatus described herein could be inserted. Examples of other doors and windows with which the fenestration unit monitoring apparatus described herein could be used may include, e.g., awning windows, hopper windows, basement/utility windows, roof windows, gliding windows, hinged patio doors, sliding patio doors, entry doors, garage doors, etc.

Figure 2:
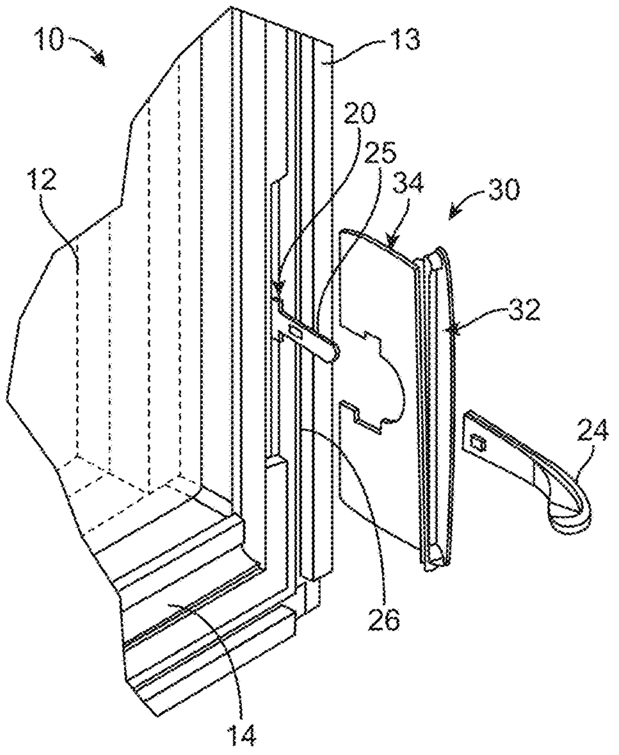
FIG. 2 is a left side perspective view of one illustrative embodiment of a fenestration unit monitoring apparatus being inserted into a lock assembly slot of a fenestration unit as described herein.
Figure 3:
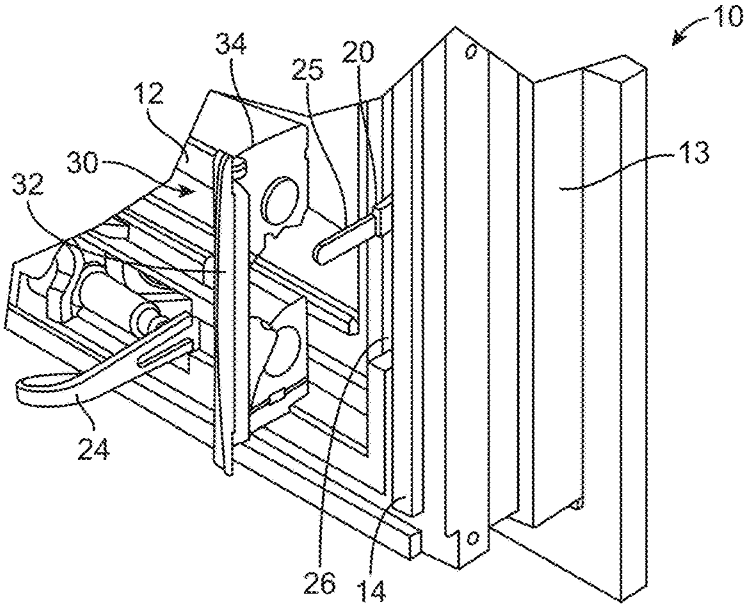
FIG. 3 is a right side perspective view of the fenestration unit monitoring apparatus of FIG. 2.
Figure 4:
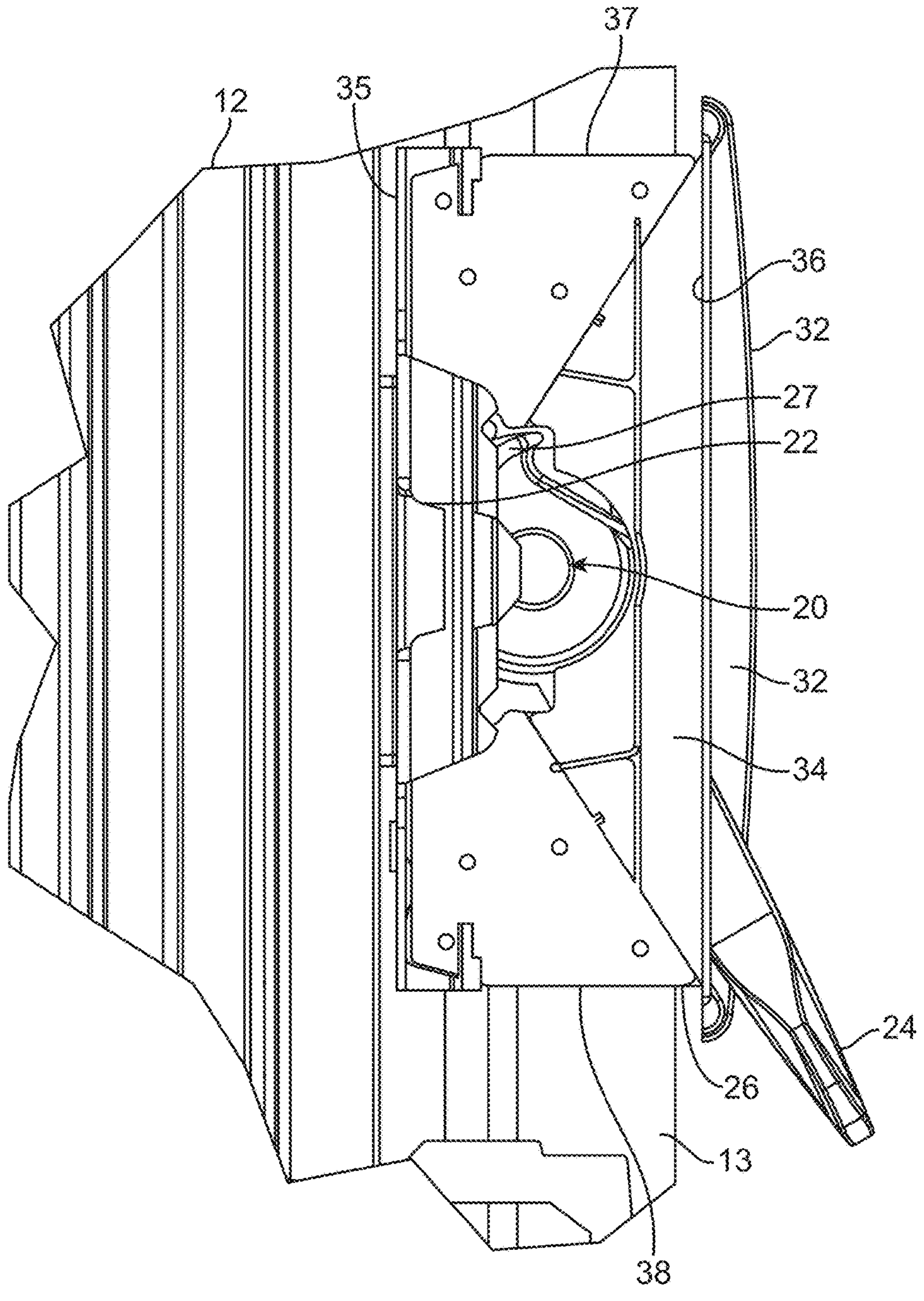
FIG. 4 is an enlarged side view of one illustrative embodiment of a fenestration unit monitoring apparatus in position over a lock assembly on a fenestration unit in which the trim members normally obscuring the fenestration unit monitoring apparatus and lock assembly are removed to expose those components.
Figure 7:
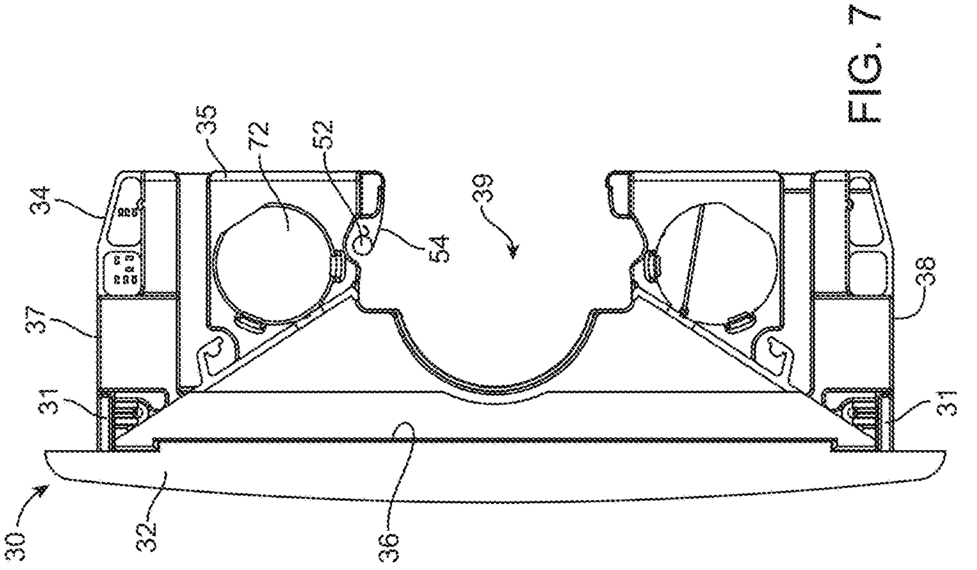
FIG. 7 is a right side view of the fenestration unit monitoring apparatus of FIG. 5.
Figure 6:
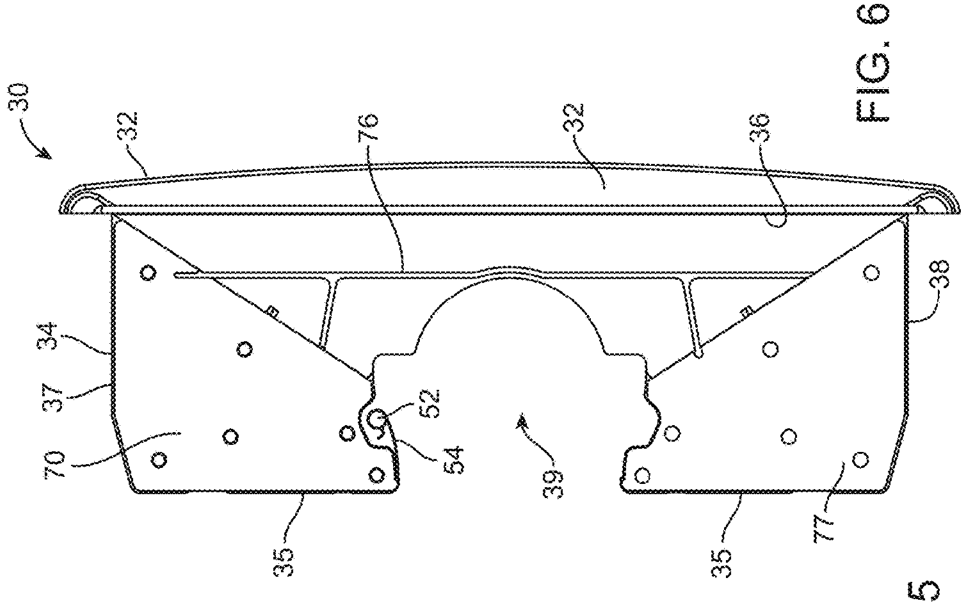
FIG. 6 is a left side view of the fenestration unit monitoring apparatus of FIG. 5.

One illustrative embodiment of a fenestration unit monitoring apparatus 30 being retrofitted to an existing lock assembly is depicted in FIGS. 2-3, with the fenestration unit monitoring apparatus being depicted in position relative to the lock assembly 20 in the view seen in FIG. 4.

Referring to FIGS. 2-3, the fenestration unit 10 including sash 12, side jamb 13 and sill 14 has a lock assembly 20 located in a lock assembly slot 26 in the side jamb 13. In the view seen in FIGS. 2-3, the lock arm 24 of the lock assembly 20 is shown removed from the lock arm receiver 25. Removal of the lock arm 24 from the lock arm receiver 25 is typically done to remove the bezel covering lock assembly slot 26 in the side jamb 13. With the standard bezel removed the depicted illustrative embodiment of fenestration unit monitoring apparatus 30 including a bezel 32 may be inserted into the lock assembly slot 26 over the lock arm receiver 25. The depicted illustrative embodiment of fenestration unit monitoring apparatus 30 includes a device body 34 attached to the bezel 32, with the device body 34 carrying components of the fenestration unit monitoring apparatus as described herein.

Turning to FIG. 4, one illustrative embodiment of the fenestration unit monitoring apparatus 30 is depicted after insertion into the lock assembly slot 26 in the side jamb 13. In the view of FIG. 4, the window frame trim stop has been removed to expose the lock assembly 20 as located in the lock assembly slot 26 and the addition of the fenestration unit monitoring device 30 in the lock assembly slot 26. The lock arm 24 has been reattached to the lock arm receiver in FIG. 4 and the cam 27 of the lock assembly 20 is depicted with the keeper 22 engaged with the cam 27. In other words, the lock arm 24 is in its locked position which is associated with a locked state of the lock assembly 20 in which the sash 12 is in the closed position for the fenestration unit 10.

The fenestration unit monitoring device 30 includes, in one or more embodiments, a bezel 32 attached to a device body 34 that includes a leading edge 35 located furthest into the lock assembly slot 26 and a trailing edge 36 to which the bezel 32 is attached. The leading edge 35 of the device body 34 can also be described as that edge of the device body 34 that is located closest to the sash 12 of the fenestration unit 10. The device body 34 also includes a first end 37 which, in the view depicted in FIG. 4, is located at the top of the device body 34 and a second end 38 which in that view is located at the bottom of the device body 34.

The illustrative embodiment of fenestration unit monitoring device 30 is depicted in various views in FIGS. 5-10 after removal from the lock assembly slot of a fenestration unit. In particular, the fenestration unit monitoring device 30 is depicted in its assembled state in FIGS. 5-7 and has been at least partially disassembled in FIGS. 8-10. The fenestration unit monitoring device 30 includes, in one or more embodiments as discussed herein, a bezel 32 attached to a device body 34 that includes a leading edge 35, a trailing edge 36 (to which the bezel 32 is attached) a first end 37 and a second end 38. In the depicted illustrative embodiment, the bezel 32 is attached to the device body 34 by arms 31 that cooperate with structures on the device body 34 to retain the bezel 32 in position on the device body 34. Although the bezel 32 in the depicted illustrative embodiment of fenestration unit monitoring apparatus 30 is provided as a separate article from the device body 34, in one or more alternative embodiments, the bezel 32 and device body 34 may be provided as an integral component that is not separable without destruction of one or both the bezel 32 and the device body 34. Providing a bezel 32 that is separate from the device body may, in one or more embodiments, provide an opportunity to allow a user to easily configure the fenestration unit monitoring apparatus described herein to include a selected bezel having a selected shape and/or color.

Figure 5:
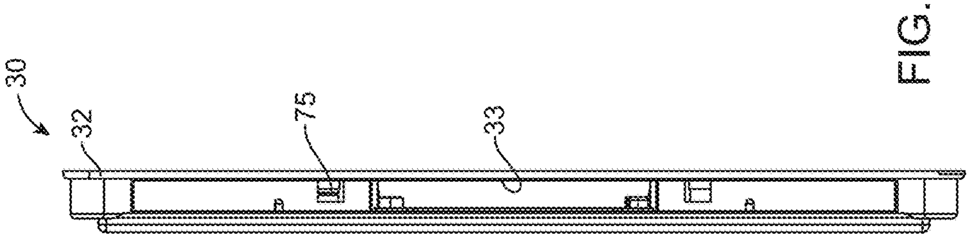
FIG. 5 is a front end view of one illustrative embodiment of a fenestration unit monitoring apparatus as described herein.
Figure 10:
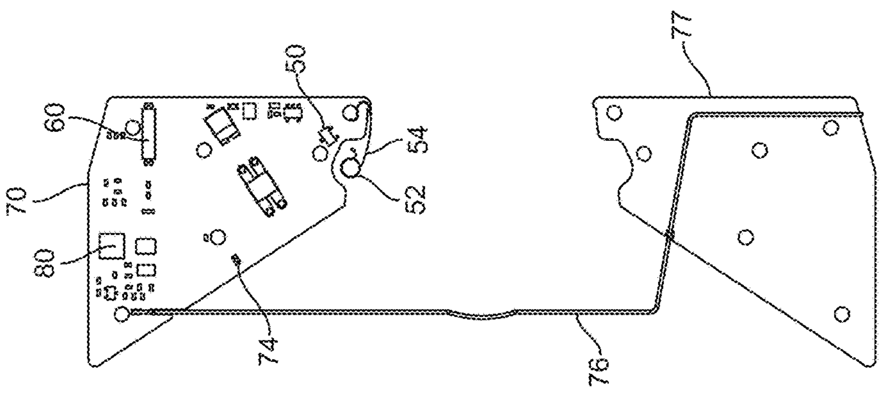
FIG. 10 is a right side view of the fenestration unit monitoring apparatus of FIG. 8 depicting the monitor body, antenna and antenna support after removal from the device body of the fenestration unit monitoring apparatus.
Figure 9:
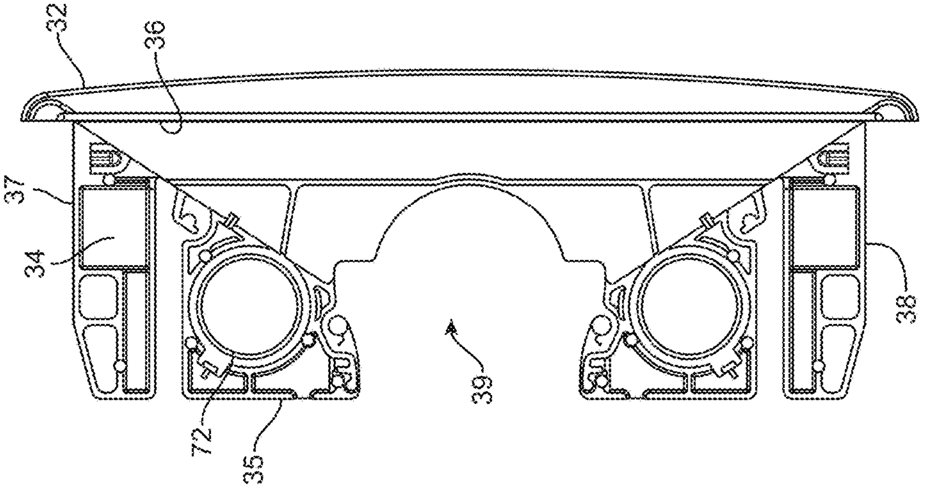
FIG. 9 is a left side view of the fenestration unit monitoring apparatus of FIG. 8 in which the monitor body, antenna, and antenna support are removed from the device body of the apparatus.
Figure 8:
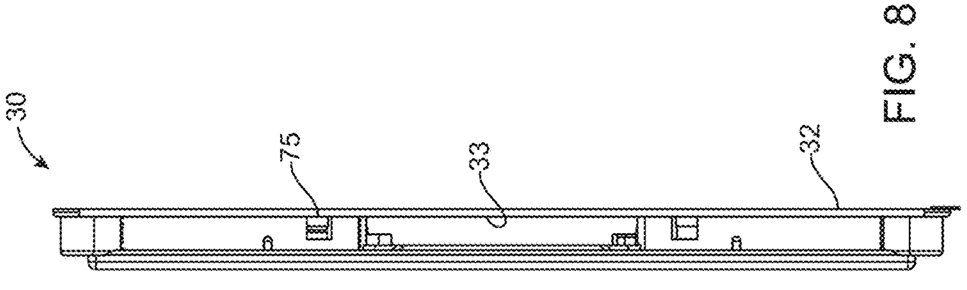
FIG. 8 is a front end view of one illustrative embodiment of a fenestration unit monitoring apparatus as described herein.

As seen in, e.g., FIGS. 5 and 8, the bezel 32 includes a lock arm aperture 33. In one or more embodiments, the lock arm aperture 33 may be described as being aligned with the trailing edge 36 of the device body 34 and offset to one side of the device body 34 such that the lock arm 24 of the lock assembly 20 passes over one side of the device body 34 when moving into and out of the locked position as described herein.

The device body 34 of the illustrative embodiment of fenestration unit monitoring apparatus 30 also includes a lock cavity 39. In one or more embodiments, the lock cavity may be described as being defined in the leading edge 35 of the device body 34 between the first end 37 and the second end 38 of the device body 34. The lock cavity 39 is, in one or more embodiments, positioned and sized to receive a portion of the lock assembly 20 located in the lock assembly slot 26 of the frame member 13 when the device body 34 is located in the lock assembly slot 26 of frame member 13 with the bezel 32 located proximate the surface of the frame member 13 (i.e., when the fenestration unit monitoring apparatus 30 is fully inserted into the lock assembly slot 26). Providing a device body 34 having a lock cavity 39 may, in one or more embodiments, allow for the use of space within the lock assembly slot 26 above and/or below the lock assembly components located within the lock assembly slot 26 without requiring routing or other modifications to increase the size of the lock assembly slot 26 or providing other openings within the frame member 13 of the fenestration unit 10.

Other features that may be included in fenestration unit monitoring apparatus as described herein include a monitor body 70 attached to the device body 34. In one or more embodiments, the monitor body 70 is located between the lock cavity 39 and the first end 37 of the device body 34. The monitor body 70 may, in one or more embodiments, be in the form of a printed circuit board or other structure capable of providing connections between various electronic components which may be provided on the monitor body 70 and used in connection with a controller 80 that is operably attached to the monitor body 70 to perform the functions of the fenestration unit monitoring apparatus as described herein.

Among the components which may be located on the monitor body 70 include a lock status sensor operably attached to the monitor body 70. The lock status sensor is, in one or more embodiments, configured to detect when the lock assembly is in a locked state. To accomplish that function, the lock status sensor may include components positioned within the lock cavity 39.

For example, in the illustrative embodiment depicted in FIGS. 5-10, the lock status sensor includes a sensor body 50 operably attached to the monitor body 70 with a trigger component 52 suspended in the lock cavity 39 by a sensor arm 54. In the depicted illustrative embodiment, a sensor body 50 may be in the form of a magnetic switch (e.g., a magnetic reed switch, Hall Effect sensor, etc.), trigger component 52 may be in the form of a permanent magnet, and sensor arm 54 may be in the form of a resilient member capable of repeated movement towards and away from the sensor body 50 as one or more components of the lock assembly act on the trigger component 52 and/or sensor arm 54 as described in more detail in connection with FIGS. 11-14.

Although the illustrative embodiment of the lock status sensor depicted in FIGS. 5-10 is in the form of a magnetic switch that is configured to sense a trigger in the form of a permanent magnet, the lock status sensor used in connection with the fenestration unit monitoring apparatus described herein may be provided in any suitable form that may or may not require a separate trigger to detect the position of a lock arm, e.g., an electro-mechanical switch (e.g., microswitch, etc.), an acoustical sensor, an RFID device, an optical sensor, a capacitive sensor, direct electrical contacts (e.g., in which one or more components of the lock assembly span a pair of contacts (that may, e.g., be attached to the monitor body) to complete a circuit), etc.

Another component which may be located on the monitor body 70 includes a panel position sensor 60 configured to detect a position of the fenestration unit panel to be locked in the closed position by the lock assembly. The panel position sensor 60 is described in more detail in connection with, e.g., FIGS. 15-16. In the illustrative embodiment of the fenestration unit monitoring apparatus 30 depicted in, however, FIGS. 5-10, the panel position sensor 60 may be, in one or more embodiments, attached to the monitor body 70 at a location closer to the leading edge 35 of the device body 34 than the trailing edge 36 of the device body 34.

In the illustrative embodiment of fenestration unit monitoring apparatus 30 depicted in FIGS. 5-10, another component that is depicted is an antenna 76 that is used, in one or more embodiments as described herein, to transmit one or more control signals indicative of the status of one or both of a lock signal and the panel position signal provided by the lock status sensor and the panel position sensor, respectively. In one or more embodiments, the antenna 76 passes between the lock cavity 39 and the trailing edge 36 of the device body 34 over a first surface of the device body 34. In one or more embodiments, the antenna 76 may be described as terminating at a location between the lock cavity 39 and the second end 38 of the device body 34. In one or more embodiments, the antenna 76 may terminate on an antenna support body 77 located on an opposite end of the device body 34.

As described herein, the bezel 32 may include, in one or more embodiments, a lock arm aperture 33 aligned with the trailing edge 36 of the device body 34 and offset to one side of the device body 34 such that the lock arm 24 of the lock assembly 20 passes over one side of the device body 34 when moving into and out of the locked position as described herein. In one or more embodiments in which an antenna 76 is provided as described herein, the antenna 76 may preferably pass over the opposite side of the device body 34 from the side over which the lock arm 24 passes. In other words, the antenna 76 is located on one side of the device body 34 while the lock arm 24 is located on the opposite side of the device body 34.

In one or more embodiments, locating the antenna 76 closer to the trailing edge 36 of the device body 34 and, therefore, the opening into the lock assembly slot 26 may be advantageous. In one advantage, for example, may be that the signals transmitted using the antenna 76 may be less likely to encounter interference due to the metallic components of the lock assembly 20 located in the lock cavity 39 when the fenestration unit monitoring device 30 is in place in a fenestration unit as described herein. Furthermore, in one or more embodiments in which the antenna 76 and a lock arm 24 are located on opposite sides of the device body 34, the lock arm 24 may be less likely to cause interference with signals transmitted using the antenna 76. Although the depicted illustrative embodiments include only one antenna, one or more alternative embodiments may include two or more antennas. In still other alternative embodiments, the antenna or antennas may extend outside of the lock assembly slot in the frame member in which the fenestration unit monitoring apparatus is located.

Yet another feature or component depicted in connection with the illustrative embodiment of fenestration unit monitoring apparatus 30 which may be provided in one or more embodiments of the fenestration unit monitoring apparatus described herein is an indicator light 74. The indicator light 74 may, in one or more embodiments, be located on the monitor body 70 and positioned such that the indicator light 74 is visible through an indicator light aperture 75 located within the lock arm aperture 33 of the device body 34. In one or more embodiments, the indicator light 74 may be used to provide a visual indication of the status of one or more of the lock assembly 20 (i.e., whether or not the lock assembly 20 is in a locked or unlocked state), the panel position (i.e., whether or not the panel is in an open or closed state), and/or the status of the fenestration unit monitoring apparatus as a whole (e.g., battery status, controller status, sensor operation, etc.). Locating the indicator light 74 such that indicator light aperture through which the indicator light is viewed are in the lock arm aperture 33 may provide a very simple indication of the status of the lock assembly where, for example, the indicator light is positioned such that it is obscured by the lock arm of the lock assembly when the lock arm is in an open condition indicating that the lock assembly is unlocked.

Still another feature or component depicted in connection with the illustrative embodiment of fenestration unit monitoring apparatus 30 as depicted in FIGS. 5-10 is a power source 72 operably attached to the monitor body to provide power to the various components, e.g., a controller, lock status sensor, panel position sensor, indicator light, etc. provided as a part of the fenestration unit monitoring apparatus. In one or more embodiments, the power source 72 may be in the form of a battery, although other power sources may be used, e.g., capacitors, wired power sources, etc.

In one or more embodiments of the fenestration unit monitoring apparatus as described herein, the device body 34 and its associated components along with the device body 34 may be constructed to allow removal of the monitor body 70 from the device body 34 and reattachment of the monitor body 70 to the device body 34 such that the monitor body 70 is located between the lock cavity 39 and the second end 38 of the device body 34. Such an arrangement could, in one or more embodiments, provide a single fenestration unit monitoring apparatus that can be adapted for a right-hand or left-hand applications in connection with fenestration units. In one or more embodiments, it may also be necessary to remove and reattach the bezel 32 such that the lock arm aperture is positioned on the opposite side of the device body 34. Furthermore, in embodiments that include components such as, e.g., antenna 76, removal and reattachment of the device body 70 may involve also removing the antenna 76 and reattaching it to the device body 34 as well (along with an optional antenna support body 77 if provided).

Referring now to FIGS. 11-14, the illustrative embodiment of illustration unit monitoring apparatus 30 is depicted in more detail to illustrate interaction between the lock assembly 20 and the lock status sensor of the fenestration unit monitoring apparatus 30. The illustrative embodiment of lock assembly 20 includes a lock arm 24 and a cam 27 which rotates to retain a keeper 22 on sash 12 when the lock assembly 20 is in the locked state. As discussed herein, the fenestration unit monitoring apparatus 30 includes a device body 34 having a leading edge 35 and a bezel 32 attached to the device body 34. The fenestration unit monitoring apparatus 30 includes a sensor body 50, trigger component 52, and sensor arm 54 which, together, provide one embodiment of a lock status sensor as used in the fenestration unit monitoring apparatus described herein.

Figure 11:
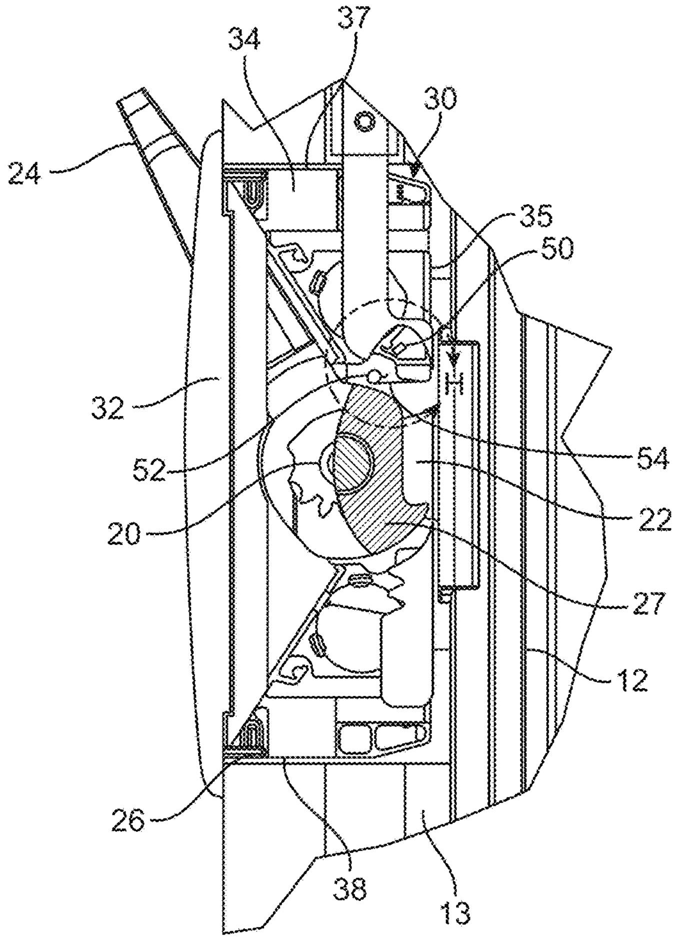
FIG. 11 is a side view of one illustrative embodiment of a fenestration unit monitoring apparatus in position in a lock assembly slot containing a lock assembly as described herein in which the lock assembly is in an unlocked state (in which the trim pieces have been removed to expose the lock assembly and fenestration unit monitoring apparatus).
Figure 12:
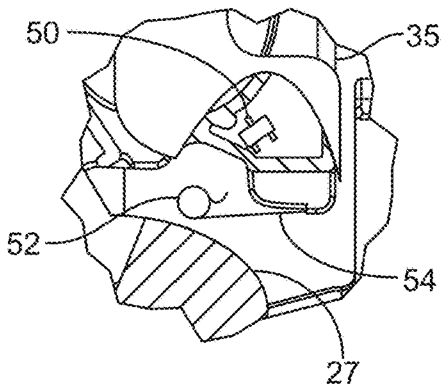
FIG. 12 is an enlarged view of a portion of FIG. 11 to illustrate relative positioning of one embodiment of a lock status sensor relative to a lock assembly in an unlocked state as described herein.

The lock assembly 20 including cam 27 and lock arm 24 are in a position associated with an unlocked state in FIGS. 11-12. As can be seen in those views, the cam 27 of the lock assembly 20 is not acting on the trigger component 52 or sensor arm 54 in the unlocked state. As a result, the distance between the sensor body 50 and the trigger component 52 is at a maximum.

Figure 13:
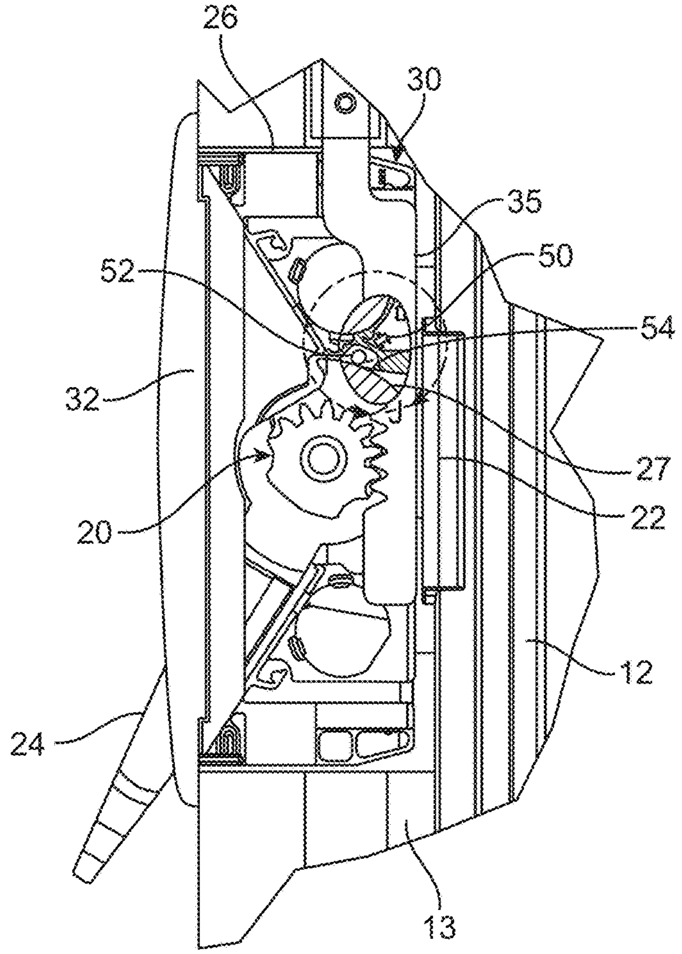
FIG. 13 is a side view of one illustrative embodiment of a fenestration unit monitoring apparatus in position in a lock assembly slot containing a lock assembly as described herein in which the lock assembly is in a locked state (in which the trim pieces have been removed to expose the lock assembly and fenestration unit monitoring apparatus).
Figure 14:
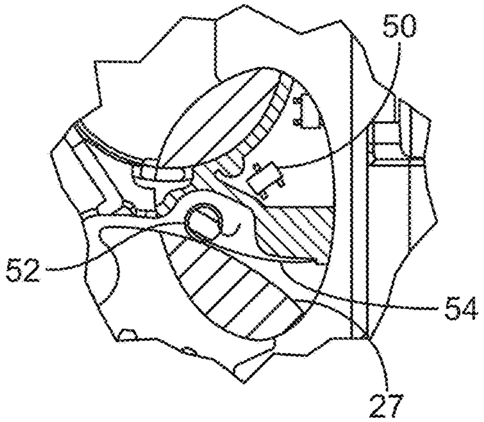
FIG. 14 is an enlarged view of a portion of FIG. 13 to illustrate relative positioning of one embodiment of a lock status sensor relative to a lock assembly in a locked state as described herein.

The lock assembly 20 is, however, moved to a locked state in which the lock arm 24 and cam 27 are rotated from their respective positions as depicted in FIGS. 13-14. Rotation of the cam 27 causes the cam 27 to act on the trigger component 52 and/or sensor arm 54 such that trigger component 52 is moved closer to the sensor body 50 (see, e.g., the enlarged view of FIG. 14 as compared to the enlarged view of FIG. 12). In one or more embodiments, moving the trigger component 52 closer to the sensor body 50 results in a signal being generated by the lock status sensor that the lock assembly 20 is in a locked state.

In general, when the sash/panel 12 is in its proper position with keeper 22 located where it can be retained by the cam 27, the locked state results in a locked state for the sash/panel 12 as well as the lock assembly 20. In some instances, however, the lock assembly 20 may be in its locked state but the keeper 22 may not be retained by the cam 27 and, as a result, although the lock assembly 20 may be in the locked state the sash/panel 12 may not itself be locked in the closed position.

To address that potential issue, the fenestration unit monitoring apparatus described herein may include a panel position sensor that is configured to detect the position of a fenestration unit panel. Indication that a fenestration unit panel is in a position associated with a closed position, will, when combined with an indication that a lock assembly is in a locked state, provide an indication that the fenestration unit is both closed and locked.

In the illustrative embodiment of fenestration unit monitoring apparatus 30 described herein, a panel position sensor 60 is attached to the monitor body 70 which is, in turn, attached to the device body 34. The panel position sensor 60 may, in one or more embodiments, take the form of any suitable sensor such as, e.g., an electro-mechanical switch (e.g., microswitch, etc.), an acoustical sensor, an RFID device, an optical sensor, a capacitive sensor, direct electrical contacts (e.g., in which one or more components of the sash/panel span a pair of contacts (attached to, e.g., the monitor body) to complete a circuit), etc.

In the depicted illustrative embodiment of fenestration unit monitoring apparatus 30, however, the panel position sensor 60 is in the form of a magnetic switch (e.g., a magnetic reed switch, Hall Effect sensor, etc.) which, as a result, requires a trigger component to provide an indication that a panel/sash is in a close or open position. In one or more embodiments, a trigger component in the form of a permanent magnet could potentially be mounted directly on a sash or other panel whose position is to be detected by the panel position sensor 60. Such an arrangement may, however, not be possible or preferred due to, e.g., distance between the trigger component and the panel position sensor, metal components in the lock assembly that may block or hinder magnetic field strength required for proper sensing, potential for dislodgement of the permanent magnet, aesthetic reasons, etc.

In one or more embodiments, a panel position sensor trigger component may be in the form of a plunger assembly in which a permanent magnet moves in response to the position of a sash/panel of the fenestration unit. The plunger assembly may, in one or more embodiments, be mounted in a bore located in the frame member, e.g., side jamb, of the fenestration unit in which the fenestration unit monitoring apparatus is located.

One illustrative embodiment of a plunger assembly that may be used in connection with the fenestration unit monitoring apparatus described herein is depicted in, e.g., FIGS. 15-18. The illustrative embodiment of plunger assembly 90 includes a plunger 92 on or in which a permanent magnet 94 is mounted. The plunger 92 is mounted for movement along a plunger axis 91 within a plunger housing 96 such that the permanent magnet 94 moves towards or away from the panel position sensor 60 of the fenestration unit monitoring apparatus 30 depending on the position of the plunger 92.

In one or more embodiments, the plunger assembly 90 includes a biasing element 98 located within the housing 96 of the plunger assembly 90. The biasing element 98 exerts a biasing force moving the plunger 92 (and, therefore, permanent magnet 94) to a first position in which the plunger 92 extends out of the housing 96 as seen in, e.g., FIG. 15. The plunger 92 is configured to move into a second position in the housing 96 along the plunger axis 91 when the plunger 92 is acted on by a force which acts on the plunger 92 against the biasing force provided by the biasing element 98. The plunger 92 is depicted in one embodiment of a second position in the housing 96 in the view seen in FIG. 16 because the plunger 92 is acted on by the sash 12 which is seen in the closed position in that view. Comparing the position of the permanent magnet 94 when the plunger 92 is in the first and second positions as seen in FIGS. 15 and 16 illustrates how the permanent magnet 94 moves towards the panel position sensor 60 as the sash 12 is moved into its closed position and, as a result, acts on the plunger 92 to move it along the plunger axis 91 against the biasing force provided by biasing element 98.

Figure 15:
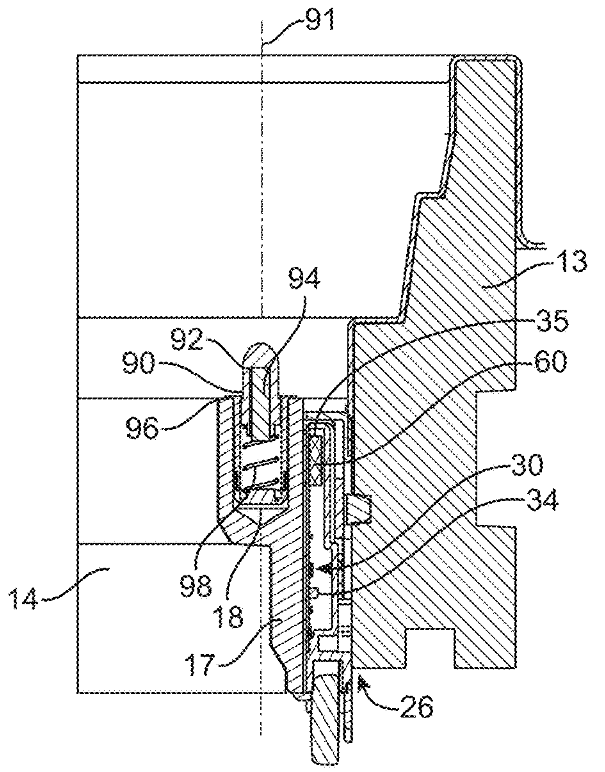
FIG. 15 is a cross-sectional view of one illustrative embodiment of a fenestration unit monitoring apparatus as located in a fenestration unit as described herein including a plunger assembly mounted in a bore formed in the fenestration unit as described herein.
Figure 16:
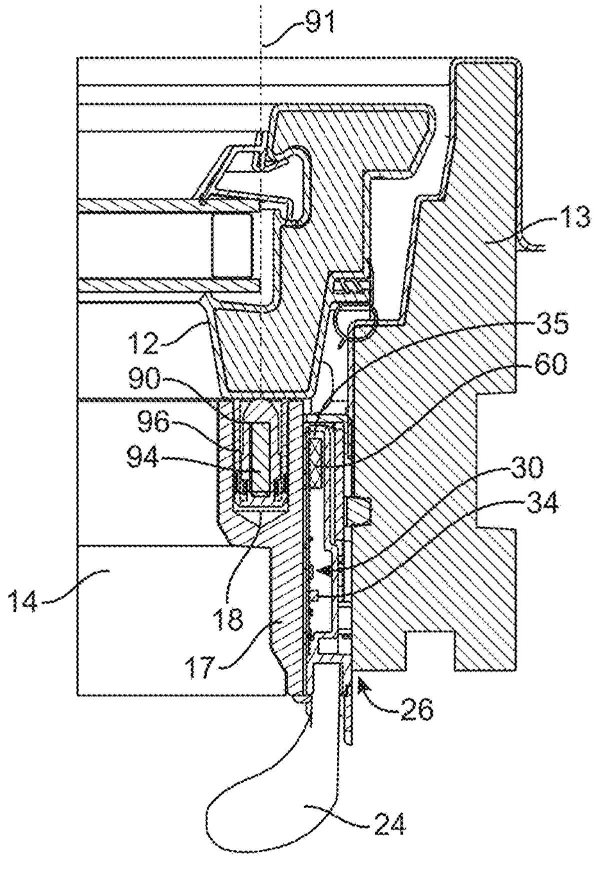
FIG. 16 is a cross-sectional view of FIG. 15, with a sash/panel in position to move a plunger assembly as described herein.
Figure 17:
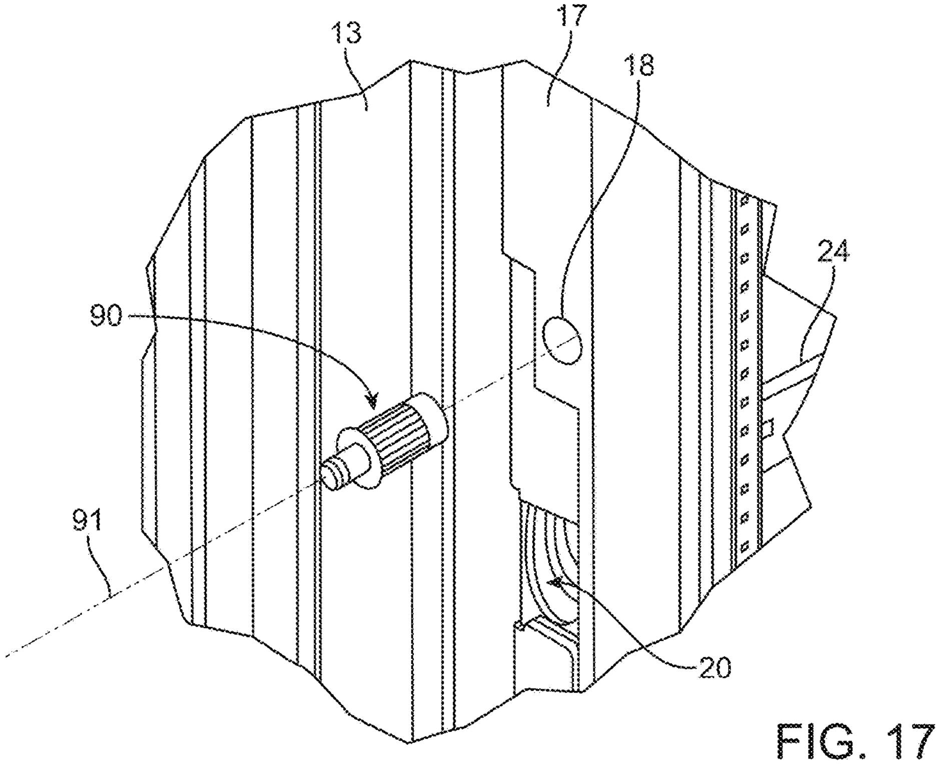
FIG. 17 is a perspective view of a portion of a fenestration unit depicting insertion of a plunger assembly into a bore formed in the fenestration unit as described herein.
Figure 18:
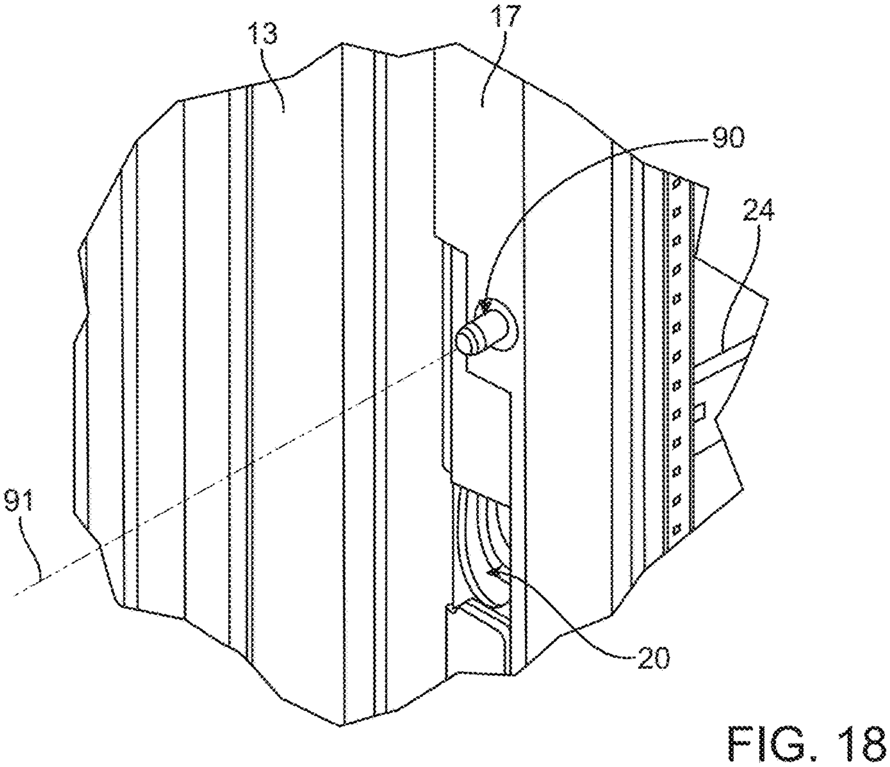
FIG. 18 is a perspective view of FIG. 17 after insertion of the plunger assembly into the bore.

With the permanent magnet 94 located closer to the panel position sensor 60 when the plunger 92 is in the first position as depicted in FIG. 16, the panel position sensor 60 is, in one or more embodiments, configured to provide a signal to, e.g., a controller indicating that a sash/panel is located in the closed position in a fenestration unit. In those embodiments in which the panel position sensor 60 is in the form of a magnetic switch, the permanent magnet 94 of the plunger assembly 90 may be described as activating the magnetic switch when the plunger 92 is in the second position of FIG. 16, but the permanent magnet 94 does not activate the magnetic switch when the plunger 92 is in the first position as seen in FIG. 15.

In one or more embodiments, the biasing element 98 used in a plunger assembly as described herein may be provided in the form of a coil spring as depicted in, e.g., FIG. 15, although biasing elements used in plunger assemblies of fenestration unit monitoring apparatus as described herein may take a variety of forms including, e.g., compressible foams, compressible rubber, elastomers, leaf springs, compressible bladders, etc.

Retrofitting an existing fenestration unit to incorporate a trigger component for a panel position sensor of a fenestration unit monitoring apparatus as described herein may pose potential difficulties and/or results and aesthetically unpleasing placement of components or require modification of a sash/panel and/or frame members of the fenestration unit which could potentially result in voiding of a warranty on the fenestration unit. The illustrative embodiments of plunger assemblies described herein may, however, provide an opportunity for retrofitting of an existing fenestration unit in a manner that does not void a manufacturer's warranty and which also provides an aesthetically acceptable yet functional arrangement.

In one or more embodiments, the plunger assemblies used in connection with fenestration unit monitoring apparatus as described herein may be located in a bore of a frame member of the fenestration unit that is located proximate the leading edge of the device body of the fenestration unit monitoring apparatus inserted into a lock assembly slot as described herein. In particular, the illustrative embodiment of fenestration unit monitoring apparatus 30 including device body 34 located in a lock assembly slot 26 of frame member 13 is positioned such that the plunger assembly 90 is located in a bore 18 formed in a frame member 17 (which is commonly referred to as a trim stop). In one or more embodiments, the bore 18 does not extend through the frame member 17 such that the bore 18 does not provide a path from an exterior of the fenestration unit to an interior of the fenestration unit. As a result, passage of air or water through the bore 18 is not possible in such an arrangement. The bore 18 is seen in the perspective view of FIG. 17 before the plunger assembly 90 is located therein, while the plunger assembly 90 is depicted as being positioned in the bore 18 in FIG. 18.

Because proper placement of a plunger assembly with its permanent magnet relative to the panel position sensor on the fenestration unit monitoring apparatus is important for proper operation and because the plunger assembly is, in one or more embodiments, provided as a separate and discrete article from the device body on which the panel position sensor is located, it may be desirable to provide accurate guidance to a user installing the fenestration unit monitoring apparatus described herein on an existing fenestration unit.

Figure 19:
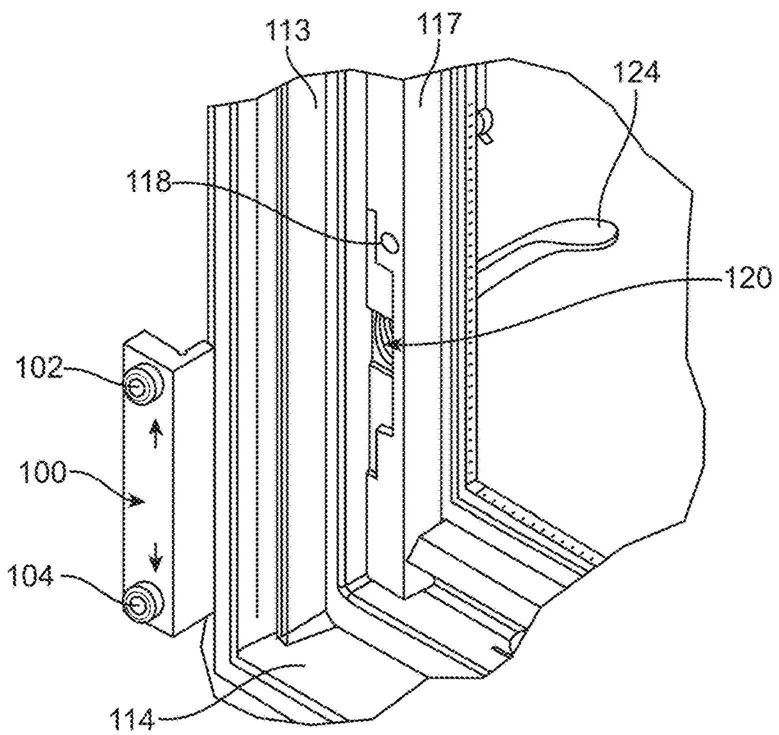
FIGS. 19 and 20 are perspective views of one illustrative embodiment of placement of a drill guide on a fenestration unit to assist in forming a bore for a plunger assembly of a fenestration unit monitoring apparatus as described herein.
Figure 20:
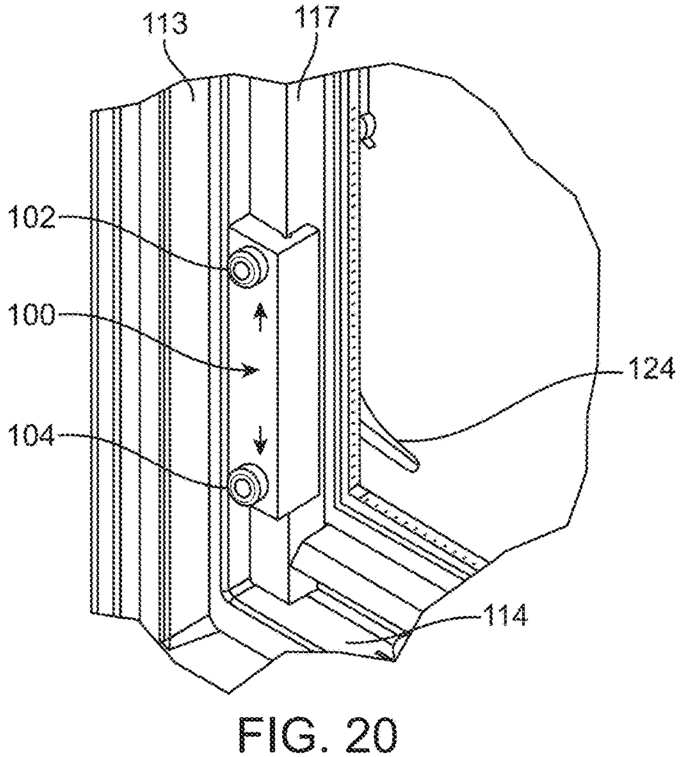
Figure 21:
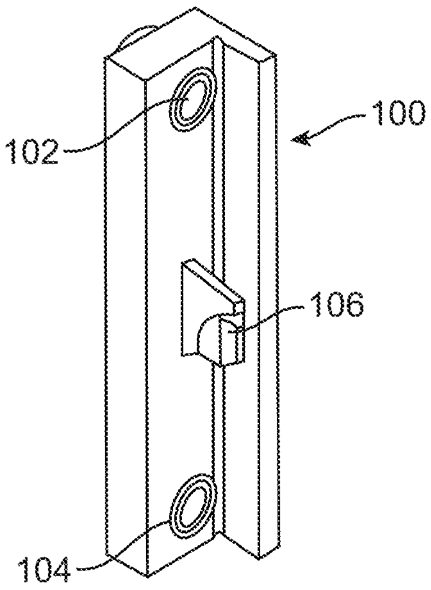
FIG. 21 is a perspective view of one illustrative embodiment of a drill guide including a keeper structure as described herein.

In particular, where a bore 18 is to be formed in a frame member of an existing fenestration unit, accurate guidance to a user drilling or otherwise forming that bore 18 may be particularly helpful. FIGS. 19-21 depict one embodiment of a drill guide 100 and method of using the guide 100 that may be useful in properly locating a bore into which a plunger assembly will be located. The fenestration unit depicted in FIGS. 19-20 includes a side jamb 113 lock assembly 120 and sill 114. As depicted, the lock assembly 120 is exposed on one side of the frame member 117 in which the bore 118 is to be formed.

Figure 22:
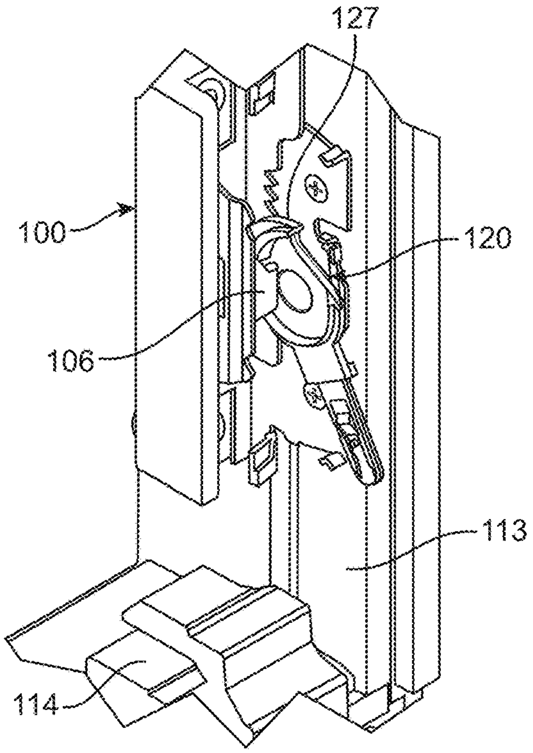
FIG. 22 is a perspective view of one illustrative embodiment of a fenestration unit having a drill guide retained in position by a lock assembly of the fenestration unit as described herein (with frame components of the fenestration unit removed to expose the lock assembly).
Figure 23:
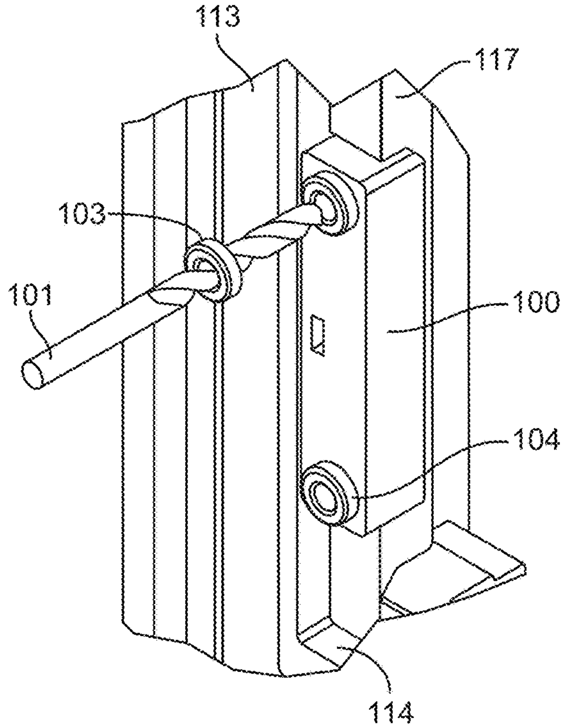
FIG. 23 is a perspective view of one method of forming a bore in a fenestration unit using a drill guide as described herein.

The drill guide 100 includes openings 102 and 104 used to provide proper placement of bore 118 above and/or below the lock assembly 120 as desired based on the location of a panel position sensor on a fenestration unit monitoring apparatus as described herein. Accurate placement of the drill guide 100 may be enhanced by providing a keeper structure 106 (see, e.g., FIG. 21) that may, in one or more embodiments, be configured to attach to the lock assembly 120 as seen in, e.g., FIG. 22 (in which the frame stop 117 in which bore 118 will be formed is removed so that the keeper structure 106 and cam 127 can be seen in that view). In particular, the depicted embodiment of drill guide 100 with its keeper structure 106 is depicted as being retained by the cam 127 of the lock assembly 120 when the lock assembly 120 is in its locked state. In one or more embodiments, such an arrangement may provide a particularly secure and known location for the drill guide 100 which corresponds to proper placement of the openings 102 and 104 in the drill guide 100.

With the drill guide 100 in its proper location, a drill 100 with a depth limiter 103 may be used to form a bore 118 in frame member 117 using opening 102. Although drill guide 100 includes two openings 102 and 104 (one of which is configured for use in a "left-hand" application and the other of which is configured for use in a "right-hand" application), it will be understood that other drill guides with similar keeper structures may include as few as one opening and three or more openings to pending on the needs for a particular situation.

Figure 24:
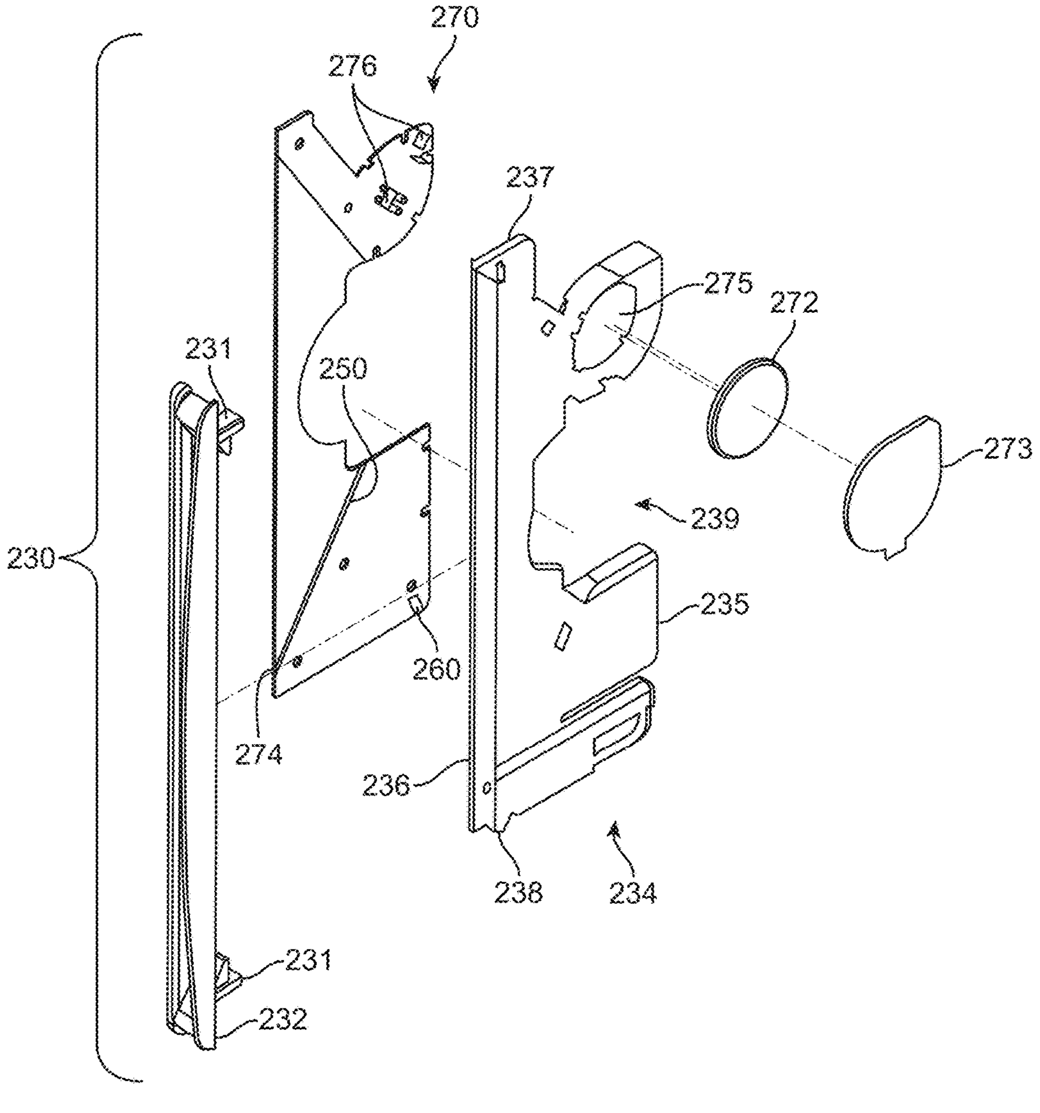
FIGS. 24 and 25 are exploded assembly diagrams taken from opposite sides of one alternative illustrative embodiment of a fenestration unit monitoring apparatus as described herein.
Figure 25:
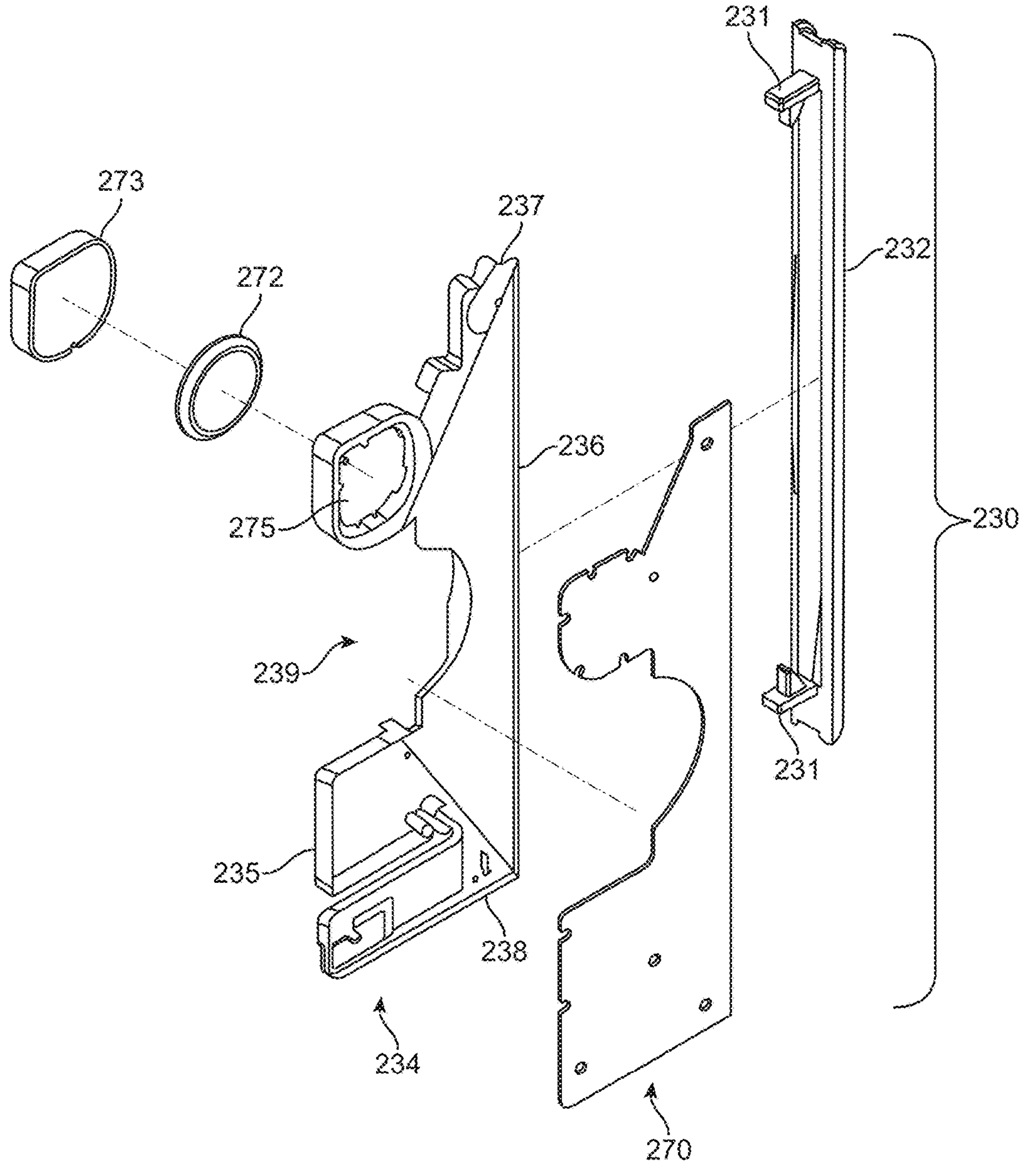
Figure 26:
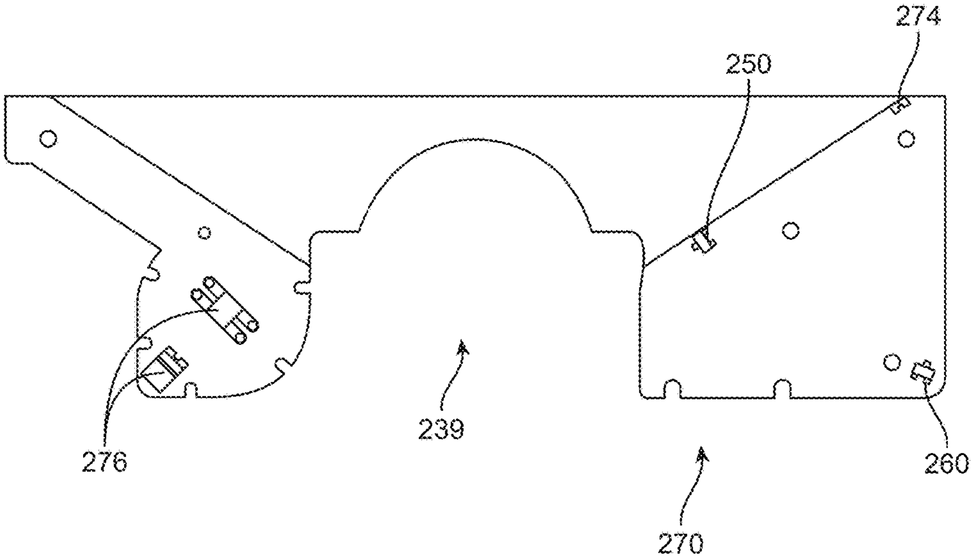
FIG. 26 is an enlarged plan view of one side of the monitor body used in the fenestration unit monitoring apparatus of FIGS. 24 and 25.

One alternative illustrative embodiment of a fenestration unit monitoring apparatus as described herein is depicted in FIGS. 24-26, in which FIGS. 24 and 25 are exploded assembly diagrams taken from opposite sides of the fenestration unit monitoring apparatus 230, while FIG. 26 is an enlarged plan view of one side of the monitor body 270 used in the fenestration unit monitoring apparatus 230.

The fenestration unit monitoring device 230 includes, in one or more embodiments, a bezel 232 attached to a device body 234 that includes a leading edge 235 and a trailing edge 236 to which the bezel 232 is attached. The device body 234 also includes a first end 237 which, in the views depicted in FIGS. 24 and 25, is located at the top of the device body 234 and a second end 238 which is located at the bottom of the device body 234 as seen in those figures.

In the depicted illustrative embodiment, the bezel 232 is attached to the device body 234 by arms 231 that cooperate with structures on the device body 234 to retain the bezel 232 in position on the device body 234. Although the bezel 232 in the depicted illustrative embodiment of fenestration unit monitoring apparatus 230 is provided as a separate article from the device body 234, in one or more alternative embodiments, the bezel 232 and device body 234 may be provided as one integral component that is not separable without destruction of one or both the bezel 232 and the device body 234. Providing a bezel 232 that is separate from the device body may, in one or more embodiments, provide an opportunity to allow a user to easily configure the fenestration unit monitoring apparatus described herein to include a selected bezel having a selected shape and/or color.

The bezel 232 of fenestration unit monitoring apparatus 230 also includes a lock arm aperture similar to the lock arm aperture 33 in the illustrative embodiment of bezel 32. In one or more embodiments the lock arm aperture may be described as being aligned with the trailing edge 236 of the device body 234 and offset to one side of the device body 234 such that the lock arm of a lock assembly passes over one side of the device body 234 when the lock arm is moving into and out of the locked position as described herein.

The device body 234 of the illustrative embodiment of fenestration unit monitoring apparatus 230 also includes a lock cavity 239. In one or more embodiments, the lock cavity 239 may be described as being defined in the leading edge 235 of the device body 234 between the first end 237 and the second end 238 of the device body 234. The lock cavity 239 is, in one or more embodiments, positioned and sized to receive a portion of the lock assembly located in a lock assembly slot of a frame member of a fenestration unit when the device body 234 is located in that lock assembly slot with the bezel 232 located proximate the surface of the frame member (i.e., when the fenestration unit monitoring apparatus 230 is fully inserted into the lock assembly slot of the frame member of the fenestration unit). Providing a device body 234 having a lock cavity 239 may, in one or more embodiments, allow for the use of space within the lock assembly slot above or below the lock assembly components located within the lock assembly slot without requiring routing or other modifications to increase the size of the lock assembly slot in the frame member or provide other openings within the frame member of a fenestration unit.

Other features that may be included in one or more embodiments of a fenestration unit monitoring apparatus 230 as described herein include a monitor body 270 attached to the device body 234. In one or more embodiments, the lock cavity 239 is also formed in the monitor body 270. The monitor body 270 may, in one or more embodiments, be in the form of a printed circuit board or other structure capable of providing electrical connections between various electronic components which may be provided on the monitor body 270 and used to perform the functions of the fenestration unit monitoring apparatus as described herein.

The side of the monitor body 270 depicted in FIG. 26 may, in one or more embodiments, be described as the component side of the monitor body 270, with the component side of the monitor body 270 facing the device body 234. As a result, components mounted on the component side of the monitor body 270 are located between the monitor body 270 and the device body 234 to provide additional protection to the components located on the component side of the monitor body 270.

Among the components which may be located on the monitor body 270 include a lock status sensor operably attached to the monitor body 270. The lock status sensor may, in one or more embodiments, be configured to detect when the lock assembly of a fenestration unit is in a locked state. To accomplish that function, the lock status sensor may include components positioned within or around the lock cavity 239.

For example, in the illustrative embodiment of fenestration unit monitoring apparatus 230 depicted in FIGS. 24-26, the lock status sensor includes a sensor body 250 operably attached to the monitor body 270 proximate the lock cavity 239 and operably connected to a controller also mounted thereon. In one or more embodiments, the sensor body 250 of the lock status sensor may be located closer to the lock cavity 239 than it is to either the first end 237 or the second end 238 of the device body 234.

In one or more embodiments, the sensor body 250 may be in the form of a magnetic switch (e.g., a magnetic Reed switch, Hall effect sensor, etc.), while a trigger component may be in the form of a magnet mounted on the lock arm of a lock assembly (or other component that moves between the locked and unlocked state of the lock assembly) with which the fenestration unit monitoring apparatus 230 is used. In one or more embodiments, the trigger component in the form of a magnet may be a separate article mounted on an existing lock arm (or other component). In one or more embodiments, the trigger component may be in the form of magnetic material that is incorporated into the structure of the lock arm (or other component) itself.

Although the illustrative embodiment of lock status sensor discussed with respect to fenestration unit monitoring apparatus 230 is in the form of a magnetic switch that is configured to sense a trigger component in the form of a magnet or magnetic material, the lock status sensors used in connection with the fenestration unit monitoring apparatus described herein may be provided in any suitable form that may or may not require a separate trigger to detect the position of a lock arm, e.g., an electromechanical switch (e.g., microswitch, etc.), an acoustical sensor, an RFID device, an optical sensor, a capacitive sensor, direct electrical contacts (e.g., in which one or more components of the lock assembly span a pair of contacts (that may, e.g., be attached to the monitor body) to complete a circuit), etc.

Another component which may be located on the monitor body 270 and operably connected to a controller also mounted thereon includes a panel position sensor 260 configured to detect a position of a fenestration unit panel to be locked in the closed position by a lock assembly. The panel position sensor 260 may, in one or more embodiments, be attached to the monitor body 270 at a location closer to the leading edge 235 of the device body 234 than the trailing edge 236 of the device body 234. In the depicted illustrative embodiment of fenestration unit monitoring apparatus 230, the panel position sensor 260 is in the form of a magnetic switch (e.g., a magnetic Reed switch, Hall effect sensor, etc.) which, as a result, requires a trigger component to provide an indication that a panel/sash is in a close or open position. In one or more embodiments, the trigger component may be in the form of a magnet or magnetic material mounted directly on a sash or other panel whose position is to be detected by the panel position sensor 260. In other embodiments, the panel position sensor trigger component may be in the form of a plunger assembly including a magnet as described elsewhere herein. In still other alternative embodiments, the panel position sensor may take the form of any suitable sensor such as, e.g., an electromechanical switch (e.g., microswitch, etc.), an acoustical sensor, an RFID device, an optical sensor, a capacitive sensor, direct electrical contacts (e.g., in which one or more components of the sash/panel span a pair of contacts (attached to, e.g., the monitor body) to complete a circuit), etc.

Yet another feature or component depicted in connection with the illustrative embodiment of fenestration unit monitoring apparatus 230 and which may be provided in one or more embodiments of the fenestration unit monitoring apparatus described herein is an indicator light 274. The indicator light 274 may, in one or more embodiments, be located on the monitor body 270 and operably connected to a controller also located thereon. The indicator light may, in one or more embodiments, be positioned such that the indicator light 274 is visible through an indicator light aperture located within the lock arm aperture of the bezel 232. In one or more embodiments, the indicator light 274 may be used provide a visual indication of the status of one or more of the lock assembly (i.e., whether or not the lock assembly is in a locked or unlocked state), the panel position (i.e., whether or not the panel is in an open or closed state), and/or the status of the fenestration unit monitoring apparatus as a whole, e.g., battery status, controller status, sensor operation, etc.). Locating the indicator light 274 such that the indicator light aperture through which the indicator light 274 is viewed are in the lock arm aperture may provide a simple indication of the status of the lock assembly where, for example, the indicator light is positioned such that it is obscured by the lock arm of the lock assembly when the lock arm is in an open condition indicating that the lock assembly is unlocked.

Still another feature or component depicted in connection with the illustrative embodiment of fenestration unit monitoring apparatus 230 is a power source 272 used to provide power to the various components of the fenestration unit monitoring apparatus 230, e.g., a controller, lock status sensor, panel position sensor, indicator light, etc. In one or more embodiments, the power source 272 may be in the form of a battery, although other power sources may be used, e.g., capacitors, wired power sources, etc. In the depicted illustrative embodiment of fenestration unit monitoring apparatus 230, the power source 272 is located within a power source cavity 275 of the device body 234. In one or more embodiments, a 273 may be used over the power source 272 to protect it from dislodgement, water, etc. When positioned within the power source cavity 275 of the device body 234, the power source 275 may be in contact with connectors 276 used to make electrical contact with the power source 272 to provide power to the various components on the monitor body 270 as described herein.

Although not specifically depicted in FIGS. 24-26, other components such as a controller, transmitter, receiver, antenna, etc. may be included as needed in the illustrative embodiment of fenestration unit monitoring apparatus 230. In one or more embodiments, one or more antennas may be integrated into the monitor body, e.g., on the opposite side of the monitor body 270 from the component side of the monitor body 270.

The fenestration unit monitoring apparatus described herein may include a variety of components. A schematic block diagram including some of the many different components that may be included in the fenestration unit monitoring apparatus described herein is provided in FIG. 27. As seen there, the fenestration unit monitoring apparatus 330 may include a controller 380 which may be operably connected to a power source 372 as described herein. The controllers used in the fenestration unit monitoring apparatus described herein may be provided in any suitable form and may, for example, include memory and a control unit. The controllers used in the fenestration unit monitoring apparatus described herein may be provided in any suitable form and may, for example, include memory and a control unit. In one or more embodiments, the control unit of a controller may, for example, be in the form of one or more microprocessors, Field-Programmable Gate Arrays (FPGA), Digital Signal Processors (DSP), microcontrollers, Application Specific Integrated Circuit (ASIC) state machines, etc.

Other components depicted in this diagram include a lock status sensor 350 and panel position sensor 360, both of which are, in one or more embodiments, operably connected to the controller 380. Although only the controller 380 is depicted as being operably connected to the power source 372, in one or more alternative embodiments the power source 372 may be directly connected to any of the other components of the fenestration unit monitoring apparatus described herein which require power in which may use that power without having the power routed through the controller 380.

Figure 27:
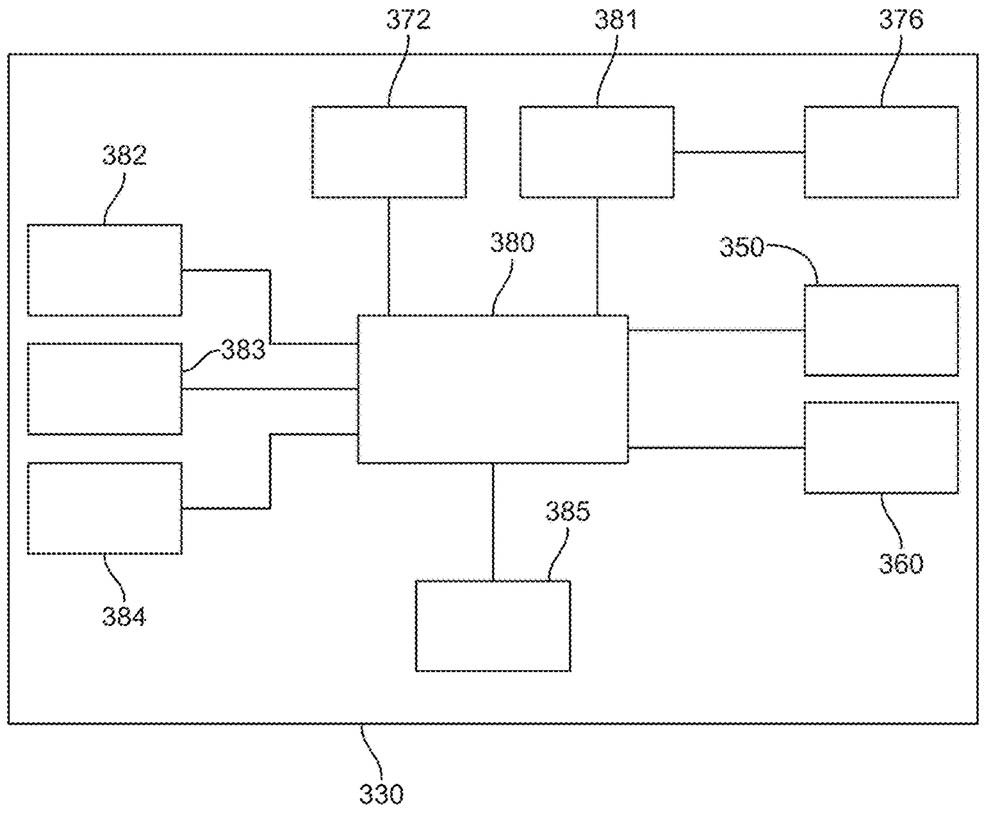
FIG. 27 is a schematic block diagram of one illustrative embodiment of a fenestration unit monitoring apparatus controller and associated devices which may be provided as part of the fenestration unit monitoring apparatus as described herein.

Also seen in the diagram of FIG. 27 is a transmitter 381 operably connected to the controller 380 and the antenna 376. The transmitter 381 may be used to transmit one or more codes, control signals, etc. indicative of the status of one or more of the signals received by the controller 380 from the various sensors and other devices that may be included in the fenestration unit monitoring apparatus described herein. Potential examples of some codes, control signals, etc. that may be provided using the transmitter 381 and antenna 376 may be described in, e.g., U.S. Pat. No. 8,624,736 to Gore et al. In one or more embodiments, the transmissions may take place using a smart phone or other control wireless control device through any suitable wireless communication protocol (e.g., Bluetooth, ZigBee, a wireless local area network (WLAN), etc.), etc.

Other optional components that may be included in the fenestration unit monitoring apparatus described herein may include one or more lights 382 (including lights other than indicator light 374 which may, for example, be used to indicate status, etc. of one or more of the sensors and/or the device as a whole), sonic devices 383 which may be used to generate and/or detect sonic energy (e.g., speakers, microphones, etc.), one or more displays 384 which may be used to display alphanumeric or other information (e.g. LCD displays, etc.), and miscellaneous sensors 385 which may include, but are not limited to, temperature sensors, humidity sensors, light sensors, moisture sensors, UV light sensors, wind speed detectors, etc.

Although the fenestration unit monitoring apparatus described herein may be used in isolation, i.e., to monitor the status of a single fenestration unit, one or more of the fenestration unit monitoring apparatus described herein may be incorporated into a system which is configured to monitor multiple fenestration units having one or more fenestration unit monitoring apparatus as described herein mounted thereon. Examples of such systems may be described in, e.g., U.S. Pat. No. 8,624,736 to Gore et al.

As discussed herein, the fenestration unit monitoring apparatus described herein may be particularly advantageous when installed to monitor status of an existing fenestration unit. In one embodiment of a method of installing a fenestration unit monitoring apparatus as described herein, the method may include (with reference to, e.g., the illustrative embodiment of fenestration unit monitoring apparatus depicted in FIGS. 2-4) inserting a device body into a lock assembly slot 26 in the frame member 13 of a fenestration unit 10 when the lock assembly slot 26 is occupied by a lock assembly 20. The device body 34 includes a leading edge 35, a trailing edge 36, a first end 37, and a second end 38. Inserting the device body 34 into the lock assembly slot 26 may include inserting the leading edge 35 of the device body 34 into the lock assembly slot 26 while the trailing edge 36 of the device body 34 is attached to a bezel 32.

Inserting the device body 34 into the lock assembly slot 26 positions, in one or more embodiments, the bezel 32 on an outer surface of the frame member 13 in which the lock assembly slot 26 is provided.

In one or more embodiments, the device body 34 includes a lock cavity 39 as described herein and inserting the device body into the lock assembly slot 26 positions the lock cavity 39 in the lock assembly slot 26 such that the lock cavity 39 receives a portion of the lock assembly 20 located in the lock assembly slot 26.

In one or more embodiments, inserting the device body 34 in to the lock assembly slot 26 positions a monitor body 70 within the lock assembly slot. As described herein, one or more embodiments of the monitor body may include a lock status sensor, a panel position sensor, and a controller operably connected to the lock status sensor and panel position sensor and configured to receive signals and provide status indications as described herein.

In one or more embodiments of the methods described herein the panel position sensor may be in the form of a magnetic switch and the method of installing the fenestration unit monitoring apparatus described herein may include, for example, forming a plunger bore in a frame member proximate the lock assembly slot. With reference to, e.g., FIGS. 15-22, the plunger bore 18 may be isolated from the lock assembly slot 26 and positioned with its opening proximate the leading edge 35 of the device body 34 and facing away from the trailing edge 36 of the device body 34. The method may further include, in one or more embodiments, inserting a plunger assembly 90 into the plunger bore 18. In one or more embodiments, the plunger assembly may include a plunger, a permanent magnet attached to the plunger and a biasing element as described herein.

In one or more embodiments of the methods described herein, forming the plunger bore 18 may include attaching a drill guide 100 to the lock assembly 120 by moving the lock assembly into its locked state, wherein a keeper 106 on the drill guide 100 is retained by a cam 127 of the lock assembly 120 which also ensures its proper positioning with respect to the lock assembly 120 and the fenestration unit monitoring apparatus located in the lock assembly slot 126 along with the lock assembly 120.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the fenestration unit monitoring apparatus and methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A fenestration unit monitoring apparatus configured for retrofitting an existing fenestration unit having a lock assembly located in a lock assembly slot in a frame member of a fenestration unit panel, the fenestration unit monitoring apparatus comprising:

- a device body configured for insertion into the lock assembly slot in the frame member of the fenestration unit panel when the lock assembly slot is occupied by the lock assembly, wherein the device body comprises a leading edge, a trailing edge, a first end located between the leading edge and the trailing edge, and a second end located between the leading edge and the trailing edge;
- a bezel attached to the device body and positioned along the trailing edge of the device body such that device body and bezel are configured for insertion of the leading edge of the device body into the lock assembly slot ahead of the trailing edge;
- a lock cavity defined in the leading edge of the device body between the first and second ends, wherein the lock cavity is positioned and sized to receive a portion of the lock assembly located in the lock assembly slot of the frame member when the device body is located in the lock assembly slot of the frame member with the bezel located proximate a surface of the frame member;
- a monitor body attached to the device body, wherein the monitor body comprises:
  - a lock status sensor operably attached to the monitor body, wherein the lock status sensor is configured to detect when the lock assembly is in a locked state;
  - a panel position sensor attached to the monitor body, the panel position sensor configured to detect a position of the fenestration unit panel;
  - a controller attached to the monitor body, wherein the controller is operably connected to the lock status sensor and the panel position sensor, and wherein the controller is configured to:
    - receive a lock signal from the lock status sensor when the lock assembly is in the locked state;

receive a panel position signal from the panel position sensor when the panel position sensor detects presence of the second panel; and provide an indication of a status of one or both of the lock signal and the panel position signal.

2. The apparatus according to claim 1, wherein the bezel comprises a lock arm aperture aligned with the trailing edge of the device body and offset to one side of the device body such that a lock arm of the lock assembly passes over one side of the device body when moving into and out of the locked position.

3. The apparatus according to claim 2, wherein the apparatus further comprises an indicator light mounted on the monitor body in a location such that the indicator light is visible through the lock arm aperture when the device body is located in the lock assembly slot.

4. The apparatus according to claim 1, wherein the lock status sensor is located closer to the lock cavity than either of the first end or the second end of the of the device body.

5. The apparatus according to claim 1, wherein the apparatus further comprises a transmitter located on the monitor body and operably connected to the controller, wherein providing an indication of the status of the lock signal, the status of the panel position signal, or the status of both the lock signal and the panel position signal comprises actuating the transmitter to transmit one or more control signals, wherein the one or more control signals are indicative of the status of the lock signal, the status of the panel position signal, or the status of both the lock signal and the panel position signal.

6. The apparatus according to claim 5, wherein the transmitter is operably connected to an antenna operably attached to the monitor body.

7. The apparatus according to claim 1, wherein the lock status sensor comprises a proximity sensor configured to detect the presence of a lock component of the lock assembly when the lock assembly is in the locked state.

8. The apparatus according to claim 1, wherein the lock status sensor comprises a magnetic switch mounted on the monitor body.

9. The apparatus according to claim 1, wherein the panel position sensor is attached to the monitor body at a location closer to the leading edge of the device body than the trailing edge of the device body.

10. The apparatus according to claim 9, wherein the panel position sensor comprises a magnetic switch.

11. The apparatus according to claim 9, wherein the apparatus further comprises a plunger assembly separate and discrete from the device body, wherein the plunger assembly is configured for insertion into a bore located in the frame member proximate the leading edge of the device body, wherein the plunger assembly comprises:

a plunger mounted for movement along a plunger axis within a housing;

a permanent magnet attached to the plunger such that the permanent magnet moves along the plunger axis with the plunger; and a biasing element located in the housing, the biasing element exerting a biasing force moving the plunger to a first position in which the plunger extends out of the housing, wherein the plunger is configured to move into a second position in the housing along the plunger axis when the plunger is acted on by a force acting on the plunger against the biasing force;

and wherein the permanent magnet activates the magnetic switch when the plunger is in the second position but does not activate the magnetic switch when the plunger is in the first position.

12. A method of installing a fenestration unit monitoring apparatus on an existing fenestration unit having a lock assembly located in a lock assembly slot in a frame member of a fenestration unit panel, the method comprising:

inserting a device body into the lock assembly slot in the frame member of the fenestration unit panel when the lock assembly slot is occupied by the lock assembly, wherein the device body comprises a leading edge, a trailing edge, a first end located between the leading edge and the trailing edge and a second end located between the leading edge and the trailing edge, and further wherein inserting the device body into the lock assembly slot comprises inserting the leading edge of the device body into the lock assembly slot while the trailing edge of the device body is attached to a bezel;

wherein inserting the device body into the lock assembly slot positions the bezel on an outer surface of the frame member;

wherein the device body comprises a lock cavity defined in the leading edge of the device body between the first and second ends, wherein inserting the device body into the lock assembly slot positions the lock cavity in the lock assembly slot such that the lock cavity receives a portion of the lock assembly located in the lock assembly slot;

and wherein inserting the device body in the lock assembly slot positions a monitor body within the lock assembly slot, wherein the monitor body is attached to the device body, wherein the monitor body comprises:

a lock status sensor operably attached to the monitor body, wherein the lock status sensor is configured to detect when the lock assembly is in a locked state;

a panel position sensor attached to the monitor body, the panel position sensor configured to detect a position of the fenestration unit panel;

a controller attached to the monitor body, wherein the controller is operably connected to the lock status sensor and the panel position sensor, and wherein the controller is configured to:

receive a lock signal from the lock status sensor when the lock assembly is in the locked state;

receive a panel position signal from the panel position sensor when the panel position sensor detects presence of the second panel; and provide an indication of a status of one or both of the lock signal and the panel position signal.

13. The method according to claim 12, wherein the bezel comprises a lock arm aperture aligned with the trailing edge of the device body and offset to one side of the device body such that a lock arm of the lock assembly passes over one side of the device body when moving into and out of the locked position.

14. The method according to claim 13, wherein the apparatus further comprises an indicator light mounted on the monitor body in a location such that the indicator light is visible through the lock arm aperture when the device body is located in the lock assembly slot.

15. The method according to claim 12, wherein the lock status sensor is located closer to the lock cavity than either of the first end or the second end of the of the device body.

16. The method according to claim 12, wherein the apparatus further comprises a transmitter located on the monitor body and operably connected to the controller, wherein providing an indication of the status of the lock signal, the status of the panel position signal, or the status of both the lock signal and the panel position signal comprises actuating the transmitter to transmit one or more control signals, wherein the one or more control signals are indicative of the status of the lock signal, the status of the panel position signal, or the status of both the lock signal and the panel position signal.

17. The method according to claim 16, wherein the transmitter is operably connected to an antenna located on the monitor body.

18. The method according to claim 12, wherein the lock status sensor comprises a magnetic switch mounted on the monitor body.

19. The method according to claim 12, wherein the panel position sensor is attached to the monitor body at a location closer to the leading edge of the device body than the trailing edge of the device body.

20. The method according to claim 12, wherein the panel position sensor comprises a magnetic switch and wherein the method further comprises:

forming a plunger bore in the frame member proximate the lock assembly slot, wherein the plunger bore is isolated from the lock assembly slot and positioned proximate the leading edge of the device body;

inserting a plunger assembly into the plunger bore, wherein the plunger assembly comprises:

a plunger mounted for movement along a plunger axis within a housing;

a permanent magnet attached to the plunger such that the permanent magnet moves along the plunger axis with the plunger; and a biasing element located in the housing, the biasing element exerting a biasing force moving the plunger to a first position in which the plunger extends out of the housing, wherein the plunger is configured to move into a second position in the housing along the plunger axis when the plunger is acted on by a force acting on the plunger against the biasing force;

and wherein the permanent magnet activates the magnetic switch when the plunger is in the second position but does not activate the magnetic switch when the plunger is in the first position.

* * * * *